(12) United States Patent
Dyne

(10) Patent No.: US 10,375,230 B2
(45) Date of Patent: Aug. 6, 2019

(54) HARDWARE SETTING RESTRICTION OF ELECTRONIC DEVICES WITHIN TRANSIT VEHICLES

(71) Applicant: Cubic Corporation, San Diego, CA (US)

(72) Inventor: Mark Dyne, Croydon (GB)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 16/117,075

(22) Filed: Aug. 30, 2018

(65) Prior Publication Data
US 2019/0068776 A1    Feb. 28, 2019

Related U.S. Application Data

(60) Provisional application No. 62/553,015, filed on Aug. 31, 2017.

(51) Int. Cl.
*H04M 1/725*    (2006.01)
*H04W 4/021*    (2018.01)

(52) U.S. Cl.
CPC ....... *H04M 1/72577* (2013.01); *H04W 4/021* (2013.01)

(58) Field of Classification Search
CPC .......................... H04M 1/72577; H04W 4/021
See application file for complete search history.

(56) References Cited

U.S. PATENT DOCUMENTS

| | | | | |
|---|---|---|---|---|
| 2010/0056124 A1* | 3/2010 | Keating | .................. | H04W 4/02 455/418 |
| 2011/0301780 A1* | 12/2011 | Miller | ................. | H04M 1/6075 701/1 |
| 2013/0295908 A1* | 11/2013 | Zeinstra | ................ | H04W 4/046 455/418 |
| 2014/0274018 A1* | 9/2014 | Miller | ................... | H04W 4/046 455/418 |
| 2015/0079962 A1* | 3/2015 | Baker | ...................... | H04W 8/18 455/418 |
| 2016/0088146 A1* | 3/2016 | Ying | ................. | H04M 1/72569 455/550.1 |
| 2018/0124234 A1* | 5/2018 | Covington, Jr. | ........ | H04L 67/18 |

* cited by examiner

*Primary Examiner* — Brandon J Miller
(74) *Attorney, Agent, or Firm* — Kilpatrick Townsend & Stockton

(57) ABSTRACT

Systems and methods for restricting electronic devices to maximum hardware settings within a transit vehicle. A method may include receiving positioning data for each of a plurality of portable electronic devices. The method may also include determining a location of each of the plurality of portable electronic devices within the transit vehicle based on the positioning data. The method may further include establishing at least one zone within the transit vehicle, assigning one or more maximum hardware settings to each of the at least one zone, and ensuring compliance of each of the plurality of portable electronic devices with the one or more maximum hardware settings based on the location of each of the plurality of portable electronic devices. The method may include transmitting, by a plurality of position sensors located throughout the transit vehicle, wireless beacon signals each indicating a transmitting position sensor of the plurality of position sensors.

16 Claims, 18 Drawing Sheets

HARDWARE SETTING RESTRICTION OF ELECTRONIC DEVICES WITHIN TRANSIT VEHICLES

CROSS-REFERENCES TO RELATED APPLICATIONS

This application claims priority to U.S. Provisional Patent Application No. 62/553,015 filed Aug. 31, 2017 titled "QUIET ZONES IN TRANSIT VEHICLES", the entire disclosure of which is hereby incorporated by reference, for all purposes, as if fully set forth herein.

BACKGROUND OF THE INVENTION

As populations in the world's largest city centers continue to grow, often at an exponential rate, public and private transportation systems are becoming increasingly burdened with increased ridership and transit stations are becoming increasingly congested, causing delays to transit users and increased costs to the transportation systems. The use of sophisticated communication devices presents an appealing approach for managing such overcrowding. Unfortunately, existing devices and approaches are insufficient to alleviate these problems. Accordingly, new systems, methods, and other techniques are needed.

SUMMARY OF THE INVENTION

Examples given below provide a summary of the present invention. As used below, any reference to a series of examples is to be understood as a reference to each of those examples disjunctively (e.g., "Examples 1-4" is to be understood as "Examples 1, 2, 3, or 4").

Example 1 is a method of restricting electronic devices to maximum hardware settings within a transit vehicle, the method comprising: receiving positioning data for each of a plurality of portable electronic devices; determining a location of each of the plurality of portable electronic devices within the transit vehicle based on the positioning data; establishing at least one zone within the transit vehicle; assigning one or more maximum hardware settings to each of the at least one zone; and ensuring compliance of each of the plurality of portable electronic devices with the one or more maximum hardware settings based on the location of each of the plurality of portable electronic devices.

Example 2 is the method of example(s) 1, further comprising: transmitting, by a plurality of position sensors located throughout the transit vehicle, wireless beacon signals each indicating a transmitting position sensor of the plurality of position sensors, wherein the wireless beacon signals are received by the plurality of portable electronic devices, and wherein the positioning data is generated and transmitted by the plurality of portable electronic devices based on the received wireless beacon signals.

Example 3 is the method of example(s) 1-2, further comprising: receiving, by a plurality of position sensors located throughout the transit vehicle, wireless beacon signals transmitted by the plurality of portable electronic devices, and wherein the positioning data is generated based on the received wireless beacon signals.

Example 4 is the method of example(s) 1-3, wherein establishing the at least one zone within the transit vehicle includes using a predetermined set of zones.

Example 5 is the method of example(s) 1-4, wherein assigning one or more maximum hardware settings to each of the at least one zone includes: receiving, from the plurality portable electronic devices, at least one user preference indicating at least one desired maximum hardware setting; and assigning the one or more maximum hardware settings to each of the at least one zone based on the desired maximum hardware setting and the location of each of the plurality of portable electronic devices.

Example 6 is the method of example(s) 1-5, wherein the one or more maximum hardware settings includes one or more of: a maximum volume setting; a maximum vibration setting; a maximum brightness setting; and a microphone setting.

Example 7 is the method of example(s) 1-6, wherein ensuring compliance of each of the plurality of portable electronic devices with the one or more maximum hardware settings based on the location includes: for each device of the plurality of portable electronic devices that is not in compliance with the one or more maximum hardware settings, sending an instruction to the device to cause the device to comply with the one or more maximum hardware settings.

Example 8 is the method of example(s) 7, wherein ensuring compliance of each of the plurality of portable electronic devices with the one or more maximum hardware settings based on the location includes: for each device of the plurality of portable electronic devices that is not in compliance with the one or more maximum hardware settings, determining which of the at least one zone the device is located in.

Example 9 is a non-transitory computer-readable medium for restricting electronic devices to maximum hardware settings within a transit vehicle, wherein the non-transitory computer-readable medium comprises instructions that, when executed by a processor, cause the processor to perform operations comprising: receiving positioning data for each of a plurality of portable electronic devices; determining a location of each of the plurality of portable electronic devices within the transit vehicle based on the positioning data; establishing at least one zone within the transit vehicle; assigning one or more maximum hardware settings to each of the at least one zone; and ensuring compliance of each of the plurality of portable electronic devices with the one or more maximum hardware settings based on the location of each of the plurality of portable electronic devices.

Example 10 is the non-transitory computer-readable medium of example(s) 9, wherein the operations further comprise: transmitting, by a plurality of position sensors located throughout the transit vehicle, wireless beacon signals each indicating a transmitting position sensor of the plurality of position sensors, wherein the wireless beacon signals are received by the plurality of portable electronic devices, and wherein the positioning data is generated and transmitted by the plurality of portable electronic devices based on the received wireless beacon signals.

Example 11 is the non-transitory computer-readable medium of example(s) 9-10, wherein the operations further comprise: receiving, by a plurality of position sensors located throughout the transit vehicle, wireless beacon signals transmitted by the plurality of portable electronic devices, and wherein the positioning data is generated based on the received wireless beacon signals.

Example 12 is the non-transitory computer-readable medium of example(s) 9-11, wherein establishing the at least one zone within the transit vehicle includes using a predetermined set of zones.

Example 13 is the non-transitory computer-readable medium of example(s) 9-12, wherein assigning one or more maximum hardware settings to each of the at least one zone includes: receiving, from the plurality portable electronic devices, at least one user preference indicating at least one desired maximum hardware setting; and assigning the one or more maximum hardware settings to each of the at least one zone based on the desired maximum hardware setting and the location of each of the plurality of portable electronic devices.

Example 14 is the non-transitory computer-readable medium of example(s) 9-13, wherein the one or more maximum hardware settings includes one or more of: a maximum volume setting; a maximum vibration setting; a maximum brightness setting; and a microphone setting.

Example 15 is the non-transitory computer-readable medium of example(s) 9-14, wherein ensuring compliance of each of the plurality of portable electronic devices with the one or more maximum hardware settings based on the location includes: for each device of the plurality of portable electronic devices that is not in compliance with the one or more maximum hardware settings, sending an instruction to the device to cause the device to comply with the one or more maximum hardware settings.

Example 16 is a system for restricting electronic devices to maximum hardware settings within a transit vehicle, the system comprising: one or more processors; a non-transitory computer-readable medium comprising instructions that, when executed by the one or more processors, cause the one or more processors to perform operations comprising: receiving positioning data for each of a plurality of portable electronic devices; determining a location of each of the plurality of portable electronic devices within the transit vehicle based on the positioning data; establishing at least one zone within the transit vehicle; assigning one or more maximum hardware settings to each of the at least one zone; and ensuring compliance of each of the plurality of portable electronic devices with the one or more maximum hardware settings based on the location of each of the plurality of portable electronic devices.

Example 17 is the system of example(s) 16, wherein the operations further comprise: transmitting, by a plurality of position sensors located throughout the transit vehicle, wireless beacon signals each indicating a transmitting position sensor of the plurality of position sensors, wherein the wireless beacon signals are received by the plurality of portable electronic devices, and wherein the positioning data is generated and transmitted by the plurality of portable electronic devices based on the received wireless beacon signals.

Example 18 is the system of example(s) 16-17, wherein the operations further comprise: receiving, by a plurality of position sensors located throughout the transit vehicle, wireless beacon signals transmitted by the plurality of portable electronic devices, and wherein the positioning data is generated based on the received wireless beacon signals.

Example 19 is the system of example(s) 16-18, wherein assigning one or more maximum hardware settings to each of the at least one zone includes: receiving, from the plurality portable electronic devices, at least one user preference indicating at least one desired maximum hardware setting; and assigning the one or more maximum hardware settings to each of the at least one zone based on the desired maximum hardware setting and the location of each of the plurality of portable electronic devices.

Example 20 is the system of example(s) 16-19, wherein ensuring compliance of each of the plurality of portable electronic devices with the one or more maximum hardware settings based on the location includes: for each device of the plurality of portable electronic devices that is not in compliance with the one or more maximum hardware settings, sending an instruction to the device to cause the device to comply with the one or more maximum hardware settings.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
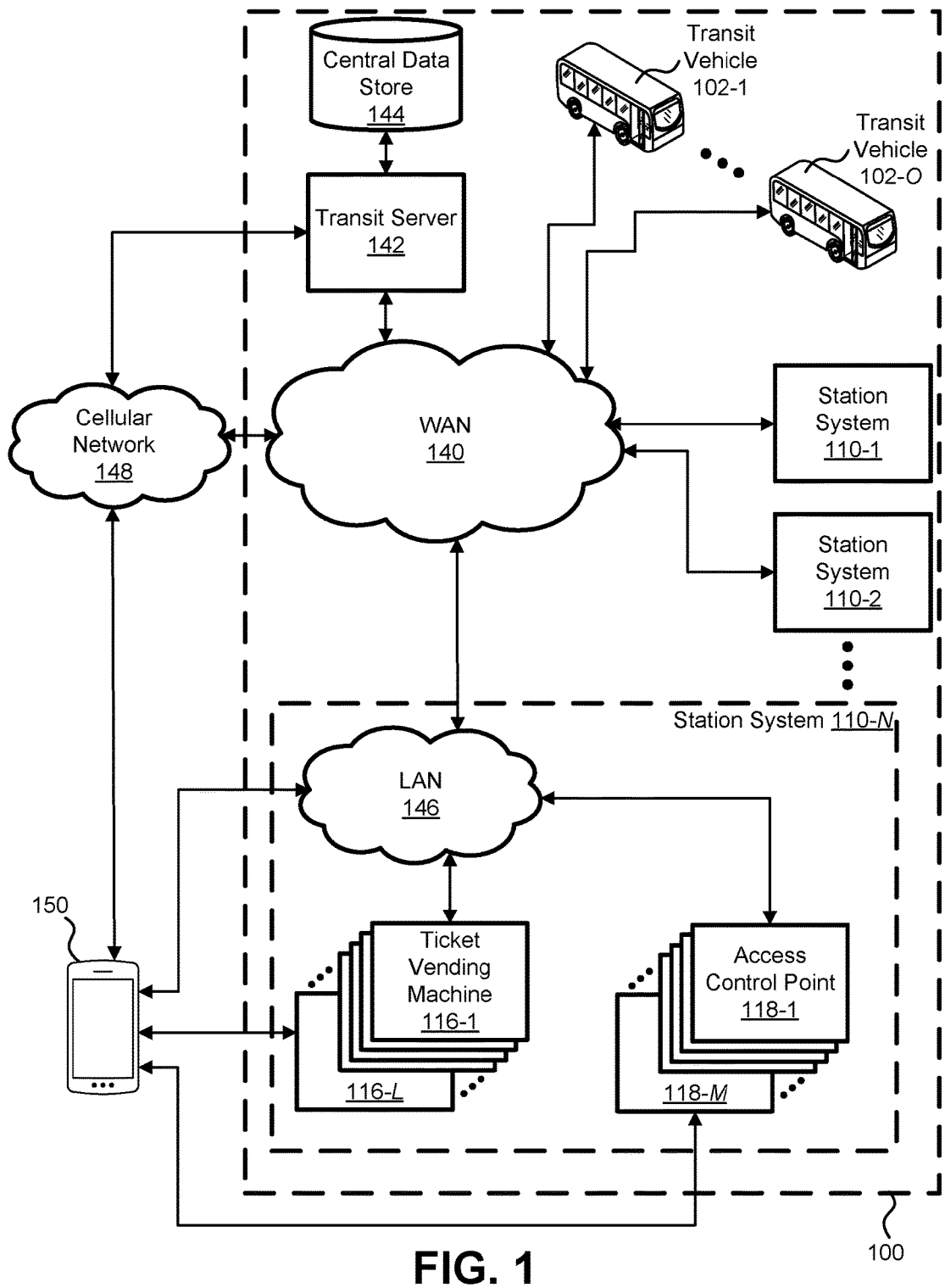
FIG. 1 illustrates a block diagram of a transit system in communication with a portable electronic device, according to some embodiments of the present invention.

Embodiments of the present invention include systems, methods, and other techniques for restricting the hardware settings of electronic devices within transit vehicles. Embodiments further provide for establishing zones in transit vehicles within which mobile devices may be automatically set to a quiet mode. In some embodiments, rather than causing a mobile device to enter a "quiet mode," embodiments may cause a mobile device to employ alternative functionality (e.g., turn off a display, power down the mobile device, lock certain settings, etc.). The use of mobile phones and other personal electronic devices in public transit and other settings can be irritating to transit users, especially in designated quiet zones. As transit systems move to adapt autonomous vehicles, transit vehicles eventually may not have a driver or other on-vehicle employee of the transit system to enforce appropriate device usage in designated quiet zones.

Some embodiments of the invention described herein are directed to creating quiet zones and enforcing behavior within the quiet zones by automatically causing devices with a quiet zone to enter a quiet mode by, for example, reducing or eliminating sounds made by the device. Embodiments can utilize Bluetooth low energy (BLE), Wi-Fi, and/or other wireless technologies to communicate with the mobile devices and/or other devices within a transit system to determine whether the devices are within a quiet zone and whether they are complying with the maximum hardware settings associated with the quiet zone.

In some embodiments, mobile devices may execute an application. The application may be utilized to perform one or more functions within the transit system, such as paying for transit services, locating transit stations, and the like. The application may be additionally used to help enforce quiet zones established within transit vehicles, such as buses, trains, etc. For instance, the application can be used to detect when the user enters a transit vehicle (e.g., by determining that a user has paid with the mobile device, by using wireless transceivers of the mobile device to detect a wireless radio frequency (RF) signal from the transit vehicle, etc.). At that point, the application may cause the mobile device to scan for wireless signals (e.g., from wireless beacons placed throughout the transit vehicle) to determine where, within the transit vehicle, the mobile device is located. If the application determines that the mobile device is in a quiet zone, it can then cause the mobile device to enter a quiet mode by turning down/off a volume level of the mobile device. In some embodiments, the determination to enter a quiet mode may be made based on factors such as whether headphones/speakers are currently in use, whether an application (e.g., media player application, speakerphone application, etc.) is causing the mobile device to make sound, and the like.

The determination of the location of the mobile device within the transit vehicle using RF signals can be made using any of a variety of techniques for determining location using wireless signals, such as Received Signal Strength Indicator (RSSI), angle of arrival, round-trip delay time (RTT), etc. In some embodiments, one or more transmitters may be located on the ceiling of the transit vehicle. In some embodiments, one or more transmitters may be located under the seat of the transit vehicle. In some embodiments, such transmitters may be activated when a sensor detects a person has sat down on a seat above the transmitter. Transmitters may each transmit a unique signal (e.g., data providing a unique identifier and/or location of the transmitter) to identify the transmitter, and the known location of the transmitters can be used to compute the location of the mobile device. In some embodiments, the known location of the transmitters may be stored locally on the mobile device or obtained by the mobile device from a transit server or other remote device via the Internet. Although the signal of a single transmitter may be sufficient to locate a position of the mobile device within the transit vehicle, the mobile device may be capable of determining a more accurate position using signals detected from multiple transmitters. In some embodiments, mobile devices (e.g. from multiple transit users) located at different locations on the mobile vehicle may additionally or alternatively communicate to help determine the location of a mobile device. For example, one or more mobile devices having a known location can communicate with a mobile device having an unknown location to help determine its position.

The determination of whether the mobile device has entered a quiet zone can be based on local and/or remote data. For example, a layout of the transit vehicle and quiet zones therein may be stored locally on the mobile device, thereby enabling the application to determine whether to enter a quiet mode by determining the location of the mobile device within the transit vehicle and comparing that location with established quiet zones as stored in local memory. Additionally or alternatively, the mobile device can communicate with a transit vehicle processor or a transit server (e.g. via the Internet using Wi-Fi or cellular data communication) to receive information regarding the layout of the transit vehicle, the location of any quiet zones, or other such information.

In some embodiments, quiet zones may be static. In other embodiments, quiet zones may be dynamic. In this latter case, for example, a transit system can determine to establish a new quiet zone in a transit vehicle based on preferences conveyed by users on the transit vehicle. For instance, if users with mobile devices indicate (e.g., via an application executed by their respective mobile devices) that they prefer to sit in a quiet zone, a transit system can use this information to establish a quiet zone around such users. This user preference may be established in real time (e.g., from a pop-up button that appears on a display of the mobile device as a user sits down), as a user enters the bus (e.g., when the user pays for the transit ride), or in user settings (e.g., when a user sets up the application, the user may set a preference to sit in a quiet zone). These preferences can be collected by a server of the transit system (e.g., via the Internet or, if the server is local to the transit vehicle, via direct RF communication).

If multiple users are in a particular area of the transit vehicle, the server can use a "voting" system to determine whether or not to establish a quiet zone. That is, if the majority of users in a particular area prefer a quiet zone, then a quiet zone can be established, and the server can communicate this to the mobile devices within the zone, causing the mobile devices to enter quiet modes. As users enter and exit the zone, such "voting" can repeat, and the quiet zone can be maintained or removed accordingly. In some embodiments, mobile devices may indicate "voting" results within quiet zones (or non-quiet zones), which can help people determine where to sit to establish a quiet zone (or non-quiet zone).

Establishing quiet zones can be done in any of a variety of ways, depending on desired functionality. For instance, in some embodiments, the entire vehicle may comprise a single potential zone, in which, based on user preferences (e.g., a majority of users preferring quiet), the entire vehicle may comprise a quiet zone. In other embodiments, the transit vehicle may be sectioned into different areas, and within each area the transit server may determine whether or not to make the area a quiet zone. In some embodiments, adjacent areas may be combined to make one large quiet zone. A person of ordinary skill in the art will appreciate other variations.

Depending on desired functionality, the mobile device can communicate various types of information to a user with regard to quiet zones. For example, in some embodiments, the application may cause a mobile device to indicate (e.g., on a screen of the mobile device) where, on a transit vehicle, quiet zones may exist (e.g., using a layout of the transit vehicle). In some embodiments, the mobile device can provide a visual indication when entering a quiet mode, indicating to a user that the user has entered a quiet zone, and (optionally) pausing media content and/or asking the user to use headphones, etc. While in a quiet mode, the application can cause a mobile device to, for example, defer incoming telephone calls. In some embodiments, the application may cause the mobile device to provide notices (e.g., via SMS message) to telephones attempting to make any incoming calls to the mobile phone in the quiet mode. In some embodiments, one or more of these features may be defined by the user. In some embodiments, the transit vehicle may have one or more displays illustrating where current quiet zones are located on the transit vehicle. In some embodiments, a light or other visual indicator may be located at or near each seat, indicating where quiet zones are established.

FIG. 1 illustrates a block diagram of a transit system 100 in communication with a portable electronic device 150, according to some embodiments of the present invention. Transit system 100 can include various forms of transit, including subway, bus, ferry, commuter rail, para-transit, etc., or any combination thereof. Transit system 100 may include a plurality of station systems 110 located at a plurality of transit locations (or simply "locations") within transit system 100. While station systems 110 are generally considered to be fixed at transit locations, transit vehicles 102 move along predetermined routes often between different transit locations. For example, a transit user may begin a trip within transit system 100 at one of station systems 110 and may travel within one of transit vehicles 102 to another of station systems 110. Examples of transit vehicles 102 may include a train, a bus, a ferry, a plane, among other possibilities. Transit system 100 achieves interconnectivity between station systems 110, transit vehicles 102, and a transit server 142 via a wide area network (WAN) 140 which may include one or more wired and/or wireless connections. Devices within each of station systems 110 are locally interconnected via a local area network (LAN) 142 which may include one or more wired and/or wireless connections. Data used by transit server 142 in connection with operation of transit system 100 may be stored in a central data store 144 communicatively coupled to transit server 142.

Each of the transit locations may include a non-restricted access area and a restricted access area. The non-restricted access area may include areas that are freely accessible to the general public, whereas the restricted access area may be reserved exclusively for customers of transit system 100. Examples of a restricted access area may include: the inside of transit vehicles 102, a bus or train platform, the inside of a bus or train station, and the like. Each of station systems 110 may include various transit machines such as ticket vending machines 116 and access control points 118. Typically, each of ticket vending machines 116 is configured to allow a transit user to purchase a transit product such as train or bus ticket and each of access control points 118 corresponds to a location where a transit product is to be presented or is required to be in the transit user's possession. In some embodiments, each of access control points 118 includes an entry point to transit system 100 that defines a passageway and separates the non-restricted access area from the restricted access area. Examples of access control points 118 include a gate, a turnstile, a platform validator, an entrance/exit to transit vehicles 102, among other possibilities. Each of access control points 118 may be communicatively coupled to LAN 146 via one or more wired and/or wireless connections.

In some embodiments, transit users may create and maintain a transit user account. The transit user account can comprise information regarding the transit user, such as a name, address, phone number, email address, user identification (such as a unique identifier of the user or other user ID), passcode (such as a password and/or personal identification number (PIN)), an identification code associated with a fare media used to identify a transit user and/or a transit user account, information regarding user preferences and user opt-in or opt-out selections for various services, product(s) associated with the transit user account, a value and/or credit associated with the product(s), information regarding a funding source for the transit user account, among other possibilities. A transit user may request a transit user account and provide the information listed above by phone (such as a call to a customer service center maintained and/or provided by transit system 100), on the Internet, at one of ticket vending machines 116, or by other means. Transit server 142 can use the information provided by the user to create the transit user account, which can be stored and/or maintained on a database, such as central data store 144.

In some embodiments, a funding source can be linked to a transit user account to provide funding to purchase transit products. The funding source can be external to transit system 100 and can be maintained by a financial institution. Such a funding source may include a savings or checking account, a prepaid account, a credit account, an e-commerce account (such as a PAYPAL® account), or more, which can transfer funds via automated clearing house (ACH) or other means. If a transit user account comprises information regarding a funding source, transit server 142 can use the information to fund purchases or other transactions of a transit user. These transactions can be made at station systems 110, transit vehicles 102, on the Internet, by phone, text, email, or a variety of other different ways, and transaction information can then be sent to transit server 142 to update the transit user account associated with the transactions and reconcile payments and purchases with the funding source. The transit server 142 can communicate with the financial institution (or other entity maintaining the funding source) through a financial network.

A transit user may interact with transit system 100 using a portable electronic device 150 communicatively coupled with various components of transit system 100. Portable electronic device 150 may be a smart phone or other mobile phone (including a near-field-communication (NFC)-enabled mobile phone), a tablet personal computer (PC), a personal digital assistant (PDA), an e-book reader, or other device. A communicative link from portable electronic device 150 to transit server 142 can be provided by a cellular network 148 in communication with WAN 140 or in direct communication with transit server 142. Portable electronic device 150 can thereby access and/or manage information of a transit user account. Furthermore, transit server 142 can send messages to portable electronic device 150 providing transit, account, and/or advertisement information to the transit user in possession of portable electronic device 150. Such messages may be based on, among other things, opt-in or opt-out selections and/or other user preferences as stored in a transit user account. A transit user can use portable electronic device 150 to download a transit application from transit server 142 or from a mobile application source. The mobile application source may be an application store or website provided by a mobile carrier or the hardware and/or software provider of portable electronic device 150.

Figure 2:
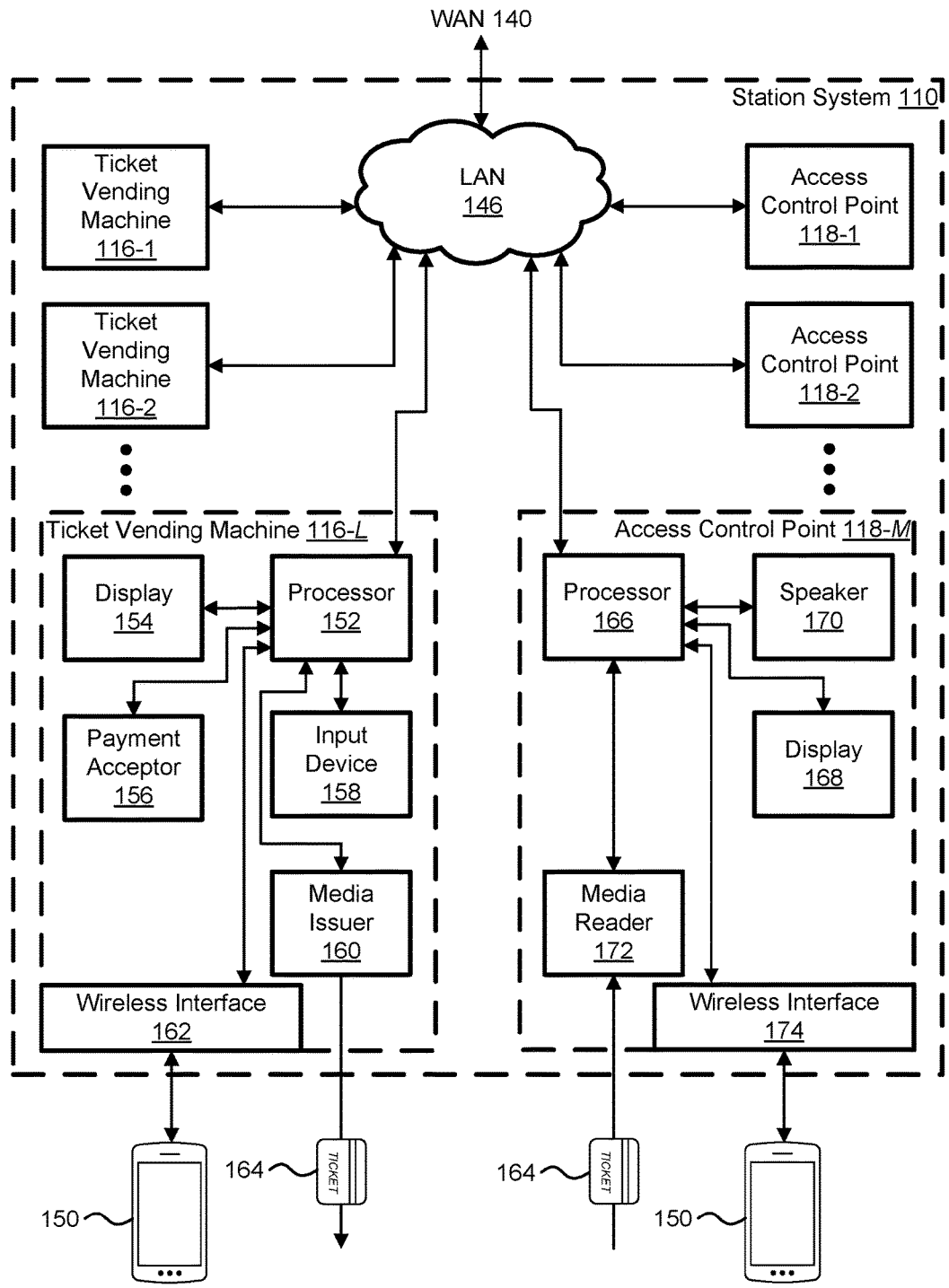
FIG. 2 illustrates a block diagram of a station system in communication with a portable electronic device, according to some embodiments of the present invention.

FIG. 2 illustrates a block diagram of station system 110 in communication with portable electronic device 150, according to some embodiments of the present invention. Specific components of ticket vending machines 116 and access control points 118 may vary from that shown in FIG. 2. In some instances, each of ticket vending machines 116 includes a processor 152 communicatively coupled with LAN 146. Processor 152 may include a single or multiple processors and an associated memory. Processor 152 may control a display 154 to display instructions for a transit user and/or a GUI through which the transit user may interact. Each of ticket vending machines 116 may further include a payment acceptor 156 for accepting cash, coin, or card-based payments, an input device 158 (such as a keypad) for receiving input from a transit user, and a media issuer 160 for dispensing a fare media 164 to the transit user. Media issuer 160 may include a printer for printing a new fare media 164 and/or a media reader/writer for adding additional value to an existing fare media 164. Each of ticket vending machines 116 may include a wireless interface 162 for enabling wireless communications between portable electronic device 150 and each of ticket vending machines 116.

In some instances, each of access control points 118 includes a processor 166 communicatively coupled with LAN 146. Processor 166 may include a single or multiple processors and an associated memory. Processor 166 may control a display 168 and a speaker 170 to provide visual and audible instructions for a transit user. Each of access control points 118 may include a media reader 172 for reading fare media 164 and, in conjunction with processor 166, for determining whether a transit user is permitted to access the non-restricted access area. Alternatively or additionally, media reader 172 may communicate with portable electronic device 150 to determine whether the transit user is permitted to access the non-restricted access area. Media reader 172 may include a contactless reader and/or a reader that requires contact with the object to be read. In some instances, media reader 172 includes a barcode reader and a barcode display. In some embodiments, display 168 and speaker 170 can give visual and audible instructions to the holder of portable electronic device 150 or fare media 164 that portable electronic device 150 or fare media 164 is not correctly placed to communicate with media reader 172. Each of access control points 118 may include a wireless interface 174 for enabling wireless communications between portable electronic device 150 and each of access control points 118. One of skill in the art will recognize that barriers associated with access control point 118 may open up to allow the holder of portable electronic device 150 or fare media 164 passage upon a successful communication between media reader 172 and portable electronic device 150 or fare media 164.

In some embodiments, wireless interfaces 162 and 174 may enable communication with portable electronic device 150 and fare media 164 by the transmission and reception of electromagnetic wireless signals. For example, devices may communicate using NFC, BLE, radio-frequency identification (RFID), and the like. In some embodiments, media reader 172 may include an RFID reader and fare media 164 may include an RFID tag. The RFID tag may be may be passive, active, or battery-assisted passive. In some embodiments, active RFID tags may be turned on and off by a user pressing a button on the RFID tag. Such embodiments may save power and preserve battery life.

Figure 3:
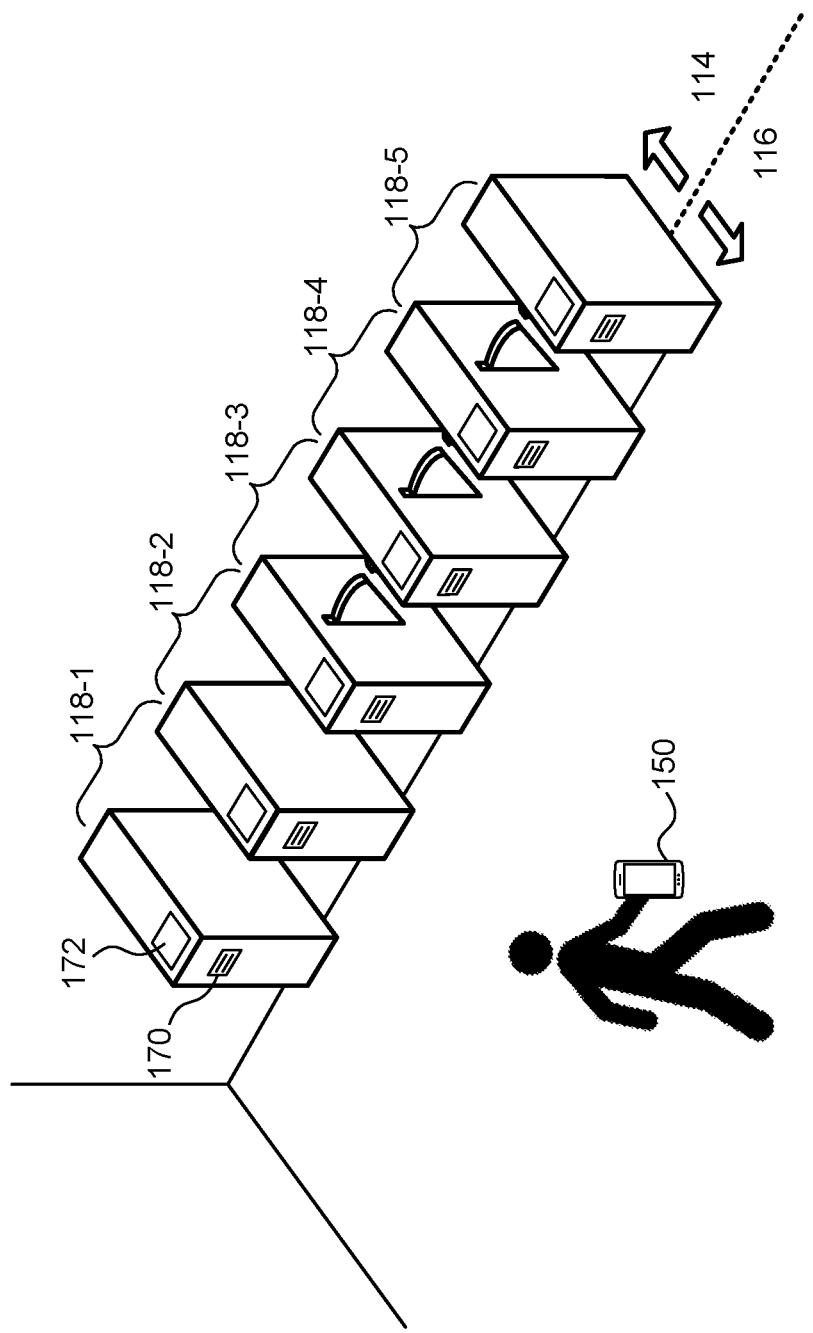
FIG. 3 illustrates various access control points at a transit location, according to some embodiments of the present invention.

FIG. 3 illustrates various access control points 118 at a transit location, according to some embodiments of the present invention. Access control points 118 may include a plurality of gates separating a restricted access area 114 from a non-restricted access area 116. One or more of access control points 118 may be barrierless (i.e., "gateless") (e.g., access control points 118-1 and 118-2) and one or more of access control points 118 may include barriers (e.g., access control points 118-3, 118-4, and 118-5). Each of access control points 118 may include media reader 172 positioned along one or both sides of the passageways formed by each of access control points 118. Each of access control points 118 may also include speaker 170 positioned near media reader 172 such that portable electronic device 150 may be near speaker 170 when a barcode displayed by portable electronic device 150 is read by media reader 172.

Figure 4:
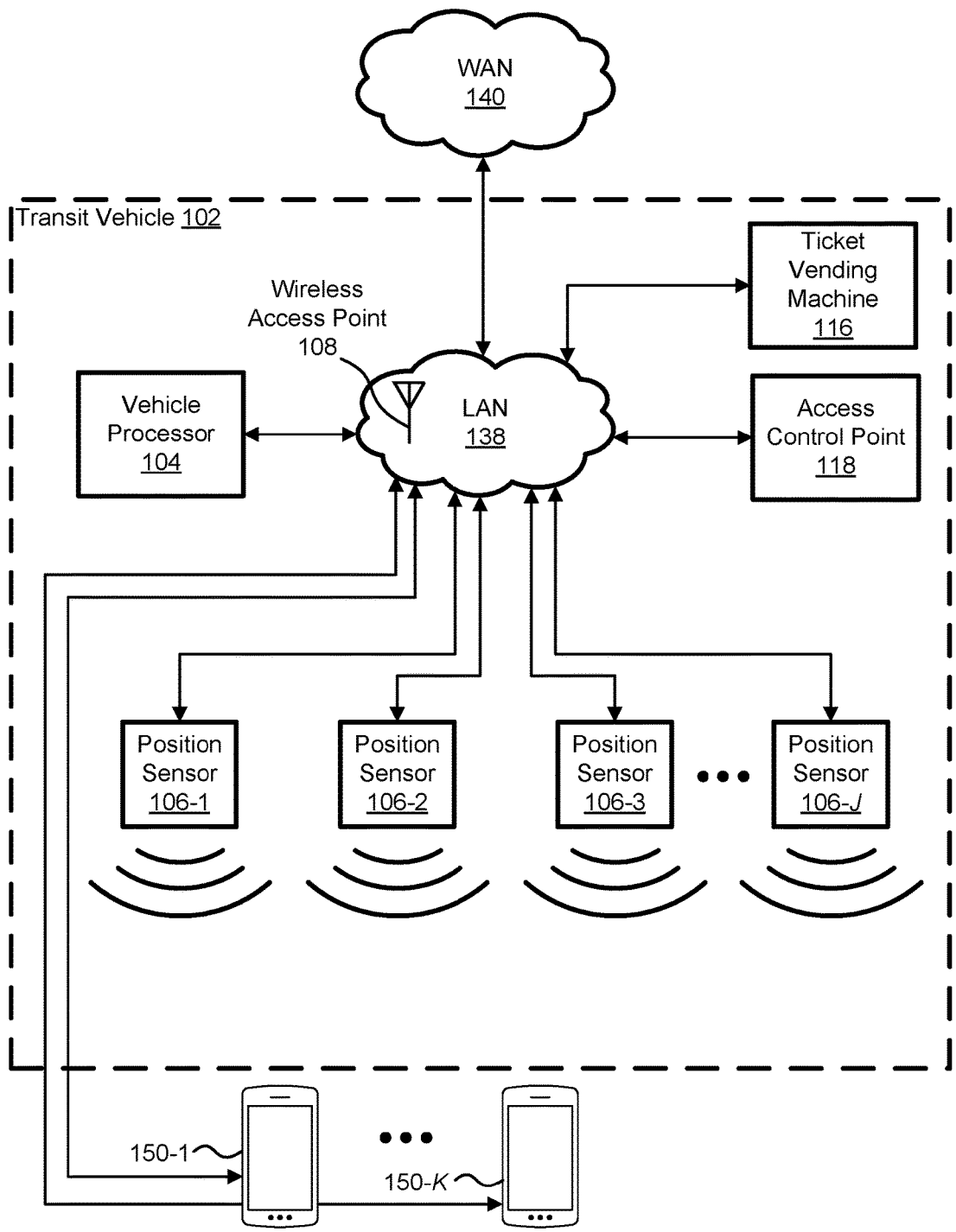
FIG. 4 illustrates a block diagram of a transit vehicle in communication with one or more portable electronic devices, according to some embodiments of the present invention.

FIG. 4 illustrates a block diagram of transit vehicle 102 in communication with one or more portable electronic devices 150, according to some embodiments of the present invention. Specific components of transit vehicle 102 may vary from that shown in FIG. 4. In some instances, transit vehicle 102 includes a vehicle processor 104 communicatively coupled with a LAN 138. Vehicle processor 104 may include a single or multiple processors and an associated memory. In some instances, transit vehicle 102 may include ticket vending machine 116 and access control point 118. For example, both ticket vending machine 116 and access control point 118 may be located at an entrance into transit vehicle 102 such that a transit user may pay a fare prior to or upon entering transit vehicle 102. In other embodiments, or in the same embodiments, ticket vending machine 116 may be located at an interior location of transit vehicle 102 such that a transit user may pay a fare subsequent to entering transit vehicle 102. In some embodiments, components of transit vehicle 102 are wirelessly connected to LAN 138 via a wireless access point 108. Wireless access point 108 may include transmitting and receiving antennas for transmitting and receiving wireless signals in one or more frequency bands in accordance with the IEEE 802.11 specifications.

In some embodiments, transit vehicle 102 may include one or more position sensors 106 configured to transit and/or receive wireless signals for determining the locations of portable electronic devices 150. In the specific implementation shown in FIG. 4, position sensors 106 transmit wireless beacon signals that are received by portable electronic devices 150. The beacon signals may be transmitted periodically, continuously, or intermittently. Each wireless beacon signal may identify which of position sensors 106 transmitted the particular wireless beacon signal and/or may identify the position of the transmitting position sensor. In response to receiving the wireless beacon signals, portable electronic devices 150 may generate and send positioning data to vehicle processor 104 via LAN 138. Vehicle processor 104 may then determine a location for each of portable electronic devices 150 based on the positioning data by, for example, performing a trilateration algorithm. Alternatively or additionally, each of portable electronic devices 150 may process the received wireless beacon signals to determine a location of the device, and the positioning data sent from portable electronic devices 150 to vehicle processor 104 may directly include the locations of the devices.

Figure 5:
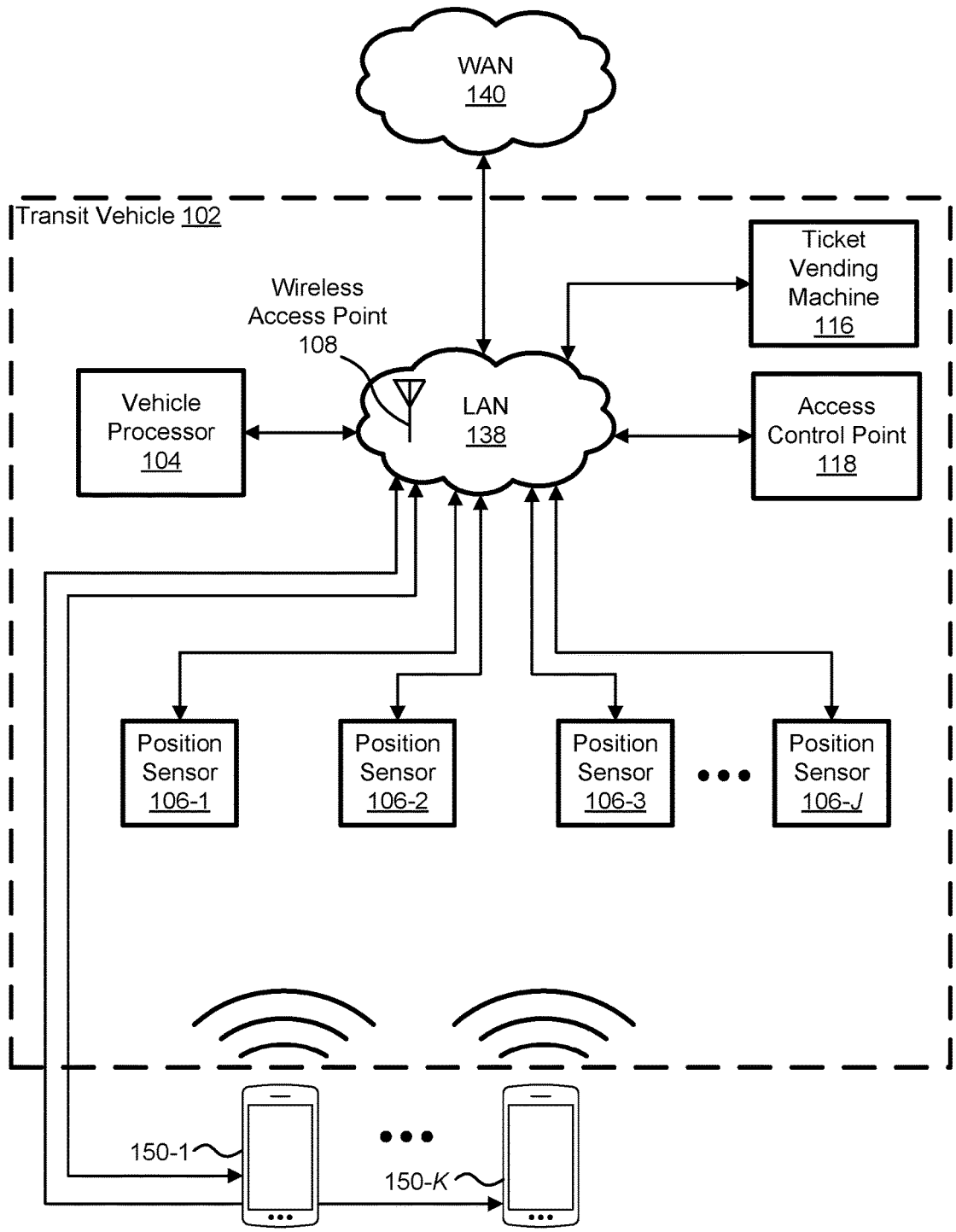
FIG. 5 illustrates a block diagram of a transit vehicle in communication with one or more portable electronic devices, according to some embodiments of the present invention.

FIG. 5 illustrates a block diagram of an alternative embodiment of transit vehicle 102 in which portable electronic devices 150 transmit wireless beacon signals that are received by position sensors 106. The beacon signals may be transmitted periodically, continuously, or intermittently. Each wireless beacon signal may identify which of portable electronic devices 150 transmitted the particular wireless beacon signal. In response to receiving the wireless beacon signals, position sensors 106 may generate and send positioning data to vehicle processor 104 via LAN 138. In some embodiments, the positioning data may include a list of received wireless beacon signals, which of portable electronic devices 150 transmitted each received wireless beacon signal, and a time at which each wireless beacon signal was received. Vehicle processor 104 may then determine a location for each of portable electronic devices 150 based on the positioning data by, for example, performing a trilateration algorithm.

Figure 6:
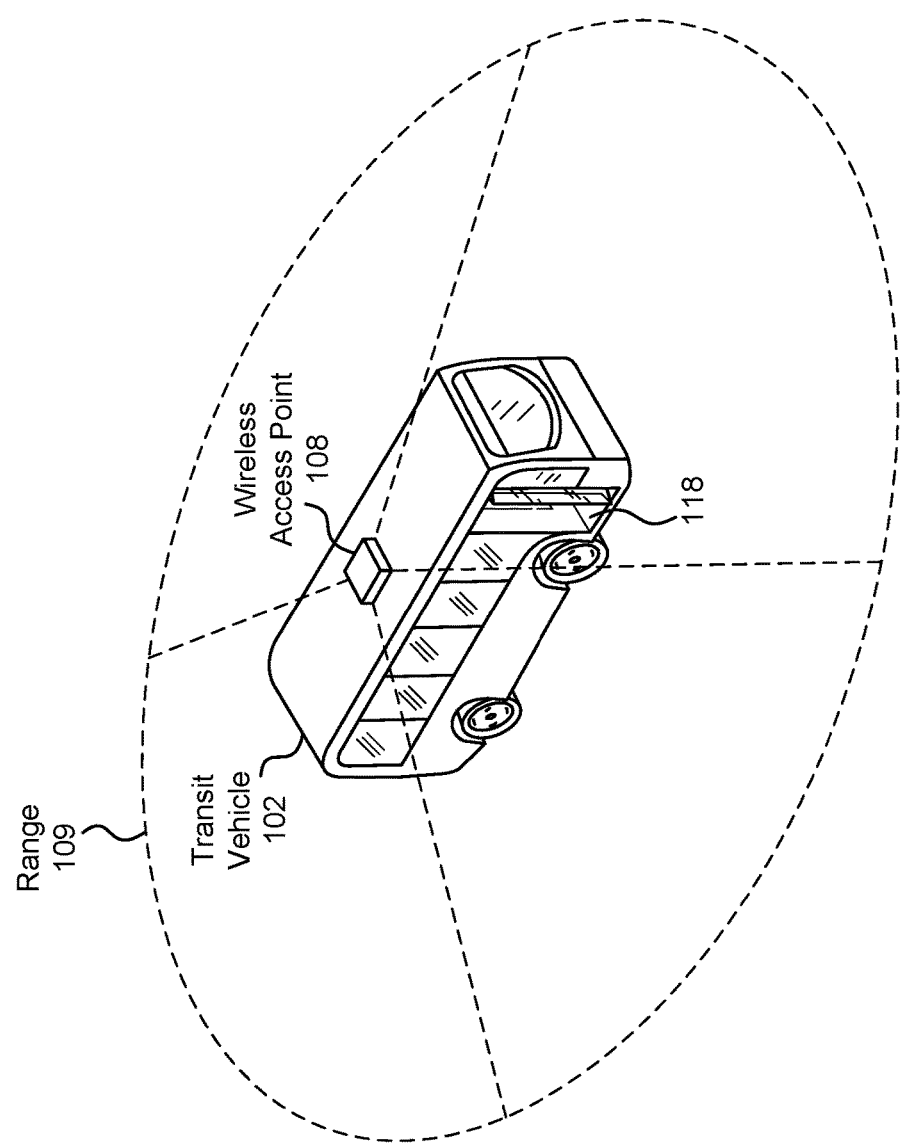
FIG. 6 illustrates a possible positioning of a wireless access point on the roof of a transit vehicle, according to some embodiments of the present invention.

FIG. 6 illustrates a possible positioning of wireless access point 108 on the roof of transit vehicle 102, according to some embodiments of the present invention. Portable electronic devices 150 may connect to LAN 138 upon entering a range 109 associated with wireless access point 108 and begin sending positioning data to vehicle processor 104 prior to entering transit vehicle 102. Portable electronic devices 150 may also use the connection to LAN 138 to communicate with transit server 142 or ticket vending machine 116 to purchase a transit product and/or to communicate with access control point 118 to gain access to transit vehicle 102. As shown in FIG. 6, access control point 118 may correspond to an entrance to transit vehicle 102.

Figure 7:
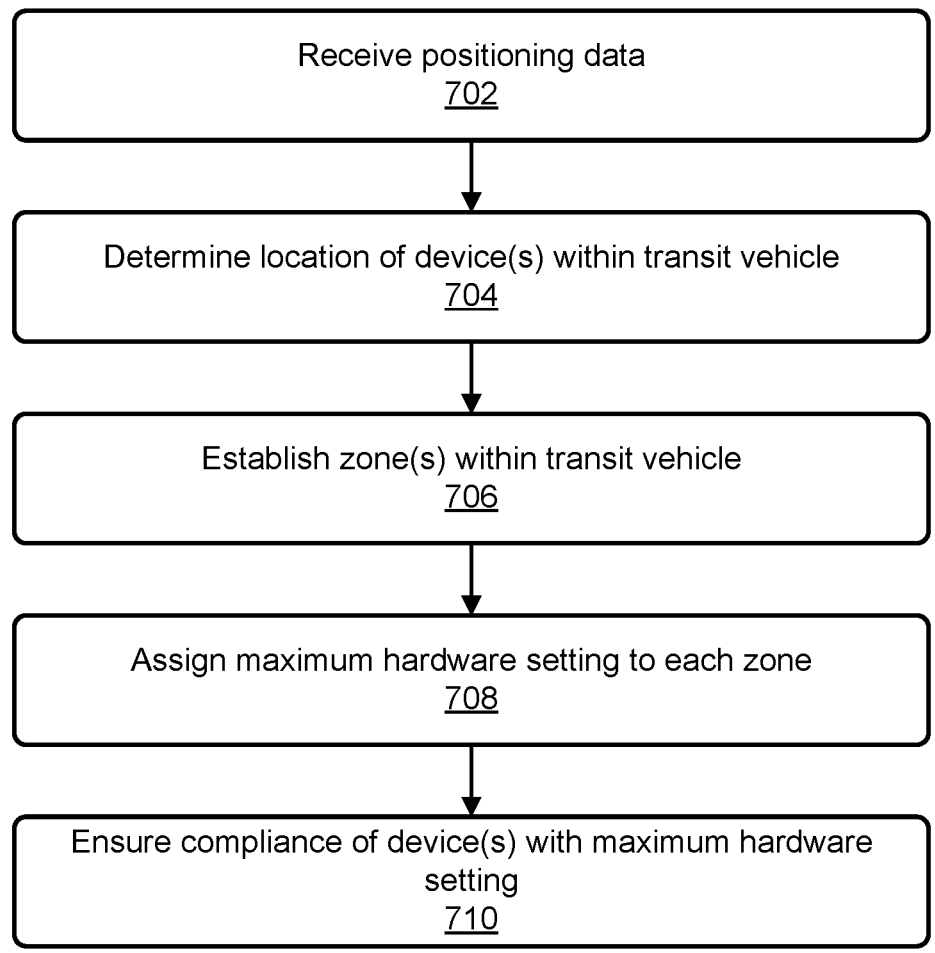
FIG. 7 illustrates a method of restricting portable electronic devices to maximum hardware settings within a transit vehicle.

FIG. 7 illustrates a method 700 of restricting portable electronic devices 150 to maximum hardware settings within transit vehicle 102. Steps of method 700 need not be performed in the order shown, and not all steps of method 700 need be performed during performance of method 700. One of more steps of method 700 may be performed by or facilitated by one or more processors of transit server 142, vehicle processor 104, position sensors 106, and/or portable electronic devices 150.

At step 702, positioning data for each of portable electronic devices 150 is received. In some embodiments, the positioning data is transmitted by portable electronic devices 150 and received by vehicle processor 104, as described in reference to FIG. 4. In some embodiments, the positioning data is transmitted by position sensors 106 and received by vehicle processor 104, as described in reference to FIG. 5. In some embodiments, the positioning data refers to the data contained in the wireless beacon signals that is received by portable electronic devices 150. Accordingly, step 702 may be performed solely by portable electronic devices 150 receiving the wireless beacon signals transmitted by position sensors 106.

At step 704, a location of each of portable electronic devices 150 within transit vehicle 102 is determined based on the positioning data. In some embodiments, the positioning data directly includes the location of each of portable electronic devices 150. In some embodiments, the positioning data is processed using, for example, a trilateration algorithm to determine the location of each of portable electronic devices 150. Each of portable electronic devices 150 may determine its own location or, in some embodiments, vehicle processor 104 may determine the location of one or more of portable electronic devices 150.

At step 706, at least one zone 182 is established within transit vehicle 102. In some embodiments, zones 182 may be predetermined for a particular transit vehicle 102. For example, a bus may include a first zone covering the front half of the bus and a second zone covering the back half of the bus. The first zone may be designated as a non-quiet zone and the second zone may be designated as a quiet zone. As another example, a non-quiet zone may cover the upper level of a double decker bus and a quiet zone may cover the lower level. In some embodiments, zones 182 may be established based on user preferences inputted by transit users into portable electronic devices 150. The user preferences may indicate at least one desired maximum hardware setting such as, but not limited to, a maximum volume setting, a maximum vibration setting, a maximum brightness setting, a microphone setting, and the like. For example, in one embodiment a transit user may enter transit vehicle 102 and input into his/her portable electronic device 150 a desired maximum volume setting of zero. Alternatively or additionally, the transit user may select a "quiet zone" option which includes a predetermined set of maximum hardware settings such as a maximum volume setting of zero and a maximum vibration setting of zero. Vehicle processor 104 may receive the desired maximum hardware settings from the transit user's portable electronic device 150 as well as other transit users' devices, and may establish zones 182 based on similar desired maximum hardware settings of transit users seated near each other.

As another example, in one embodiment a transit user may, prior to entering transit vehicle 102, input into his/her portable electronic device 150 a desired maximum hardware setting by selecting a "non-quiet zone" option which includes a predetermined set of maximum hardware settings such as a maximum volume setting of a non-zero value (e.g., 100%) and a maximum vibration setting of a non-zero value (e.g., 100%). Vehicle processor 104 may receive the desired maximum hardware settings from the transit user's portable electronic device 150 as well as other devices of transit users also entering transit vehicle 102, and may establish zones 182 based on the received desired maximum hardware settings. For example, the sizes of zones 182 may be determined based on the quantity of transit users having similar desired maximum hardware settings. Vehicle processor 104 may then communicate zones 182 to portable electronic devices 150 so that the transit users may find a seat within the zone having their desired maximum hardware settings.

As another example, a transit user may update, using his/her portable electronic device 150, a desired maximum hardware setting by switching from a "non-quiet zone" option to a "quiet zone" option. Vehicle processor 104 may receive the updated desired maximum hardware settings from the transit user's portable electronic device 150 as well as other updated desired maximum hardware settings from other devices of transit users seated in transit vehicle 102, and may establish (i.e., modify) zones 182 based on the received updated desired maximum hardware settings. Accordingly, zones 182 may be established and re-established while transit vehicle 102 is traveling to and from station systems 110 so as to accommodate the changing preferences of transit users. Each time zones 182 are re-established, vehicle processor 104 may communicate the new zones 182 to each of portable electronic devices 150 so that the transit users are aware of the changes.

At step 708, one or more maximum hardware settings are assigned to each of zones 182. The maximum hardware settings may include a maximum volume setting, a maximum vibration setting, a maximum brightness setting, a microphone setting, and the like. In many embodiments, step 708 may be performed concurrently with step 706 such as in situations where zones 182 are established based on user preferences. In some embodiments, the assignment of maximum hardware settings to zones 182 is made separate from establishing the physical boundaries of zones 182. For example, zones 182 may be predetermined and the assignment of maximum hardware settings to zones 182 may be made based on a voting amongst users currently located in each of zones 182. For example, if a majority of transit users within one of zones 182 input a user preference for a quiet zone, then the maximum hardware settings consistent with a quiet zone (e.g., maximum volume setting of zero) are assigned to the particular zone. As described in reference to step 706, the establishing of zones 182 and the assignment of maximum hardware settings to zones 182 may be performed dynamically while transit vehicle 102 is traveling to and from station systems 110 so as to accommodate the changing preferences of transit users.

At step 710, compliance of each of portable electronic devices 150 with the assigned maximum hardware settings is ensured based on the location of each of portable electronic devices 150. In some embodiments, step 710 is performed by, for each of portable electronic devices 150, determining a current location of the device, determining which of zones 182 the device is located in, determining which maximum hardware settings are assigned to the zone the device is located in, and sending an instruction to the device to cause the device to comply with the maximum hardware settings assigned to the zone the device is located in. For example, the instruction may cause the volume setting and/or the vibration setting of portable electronic device 150 to be lowered to the maximum amount(s). Alternatively or additionally, the instruction may warn portable electronic device 150 that it is not in compliance with the maximum hardware settings and may warn of possible consequences of continued non-compliance, such as the transit user's ticket becoming invalid and/or the transit user's account being charged a fee. For example, step 710 may be performed by charging the transit user's account a fee each time the transit user's portable electronic device 150 is found to be non-compliant with the corresponding maximum hardware settings. The fee may be constant or may increase each time non-compliance is found.

In some embodiments, step 710 may be performed periodically at predetermined intervals while transit vehicle 102 is operating so that each of portable electronic devices 150 remain compliant with the assigned maximum hardware settings. Step 710 may also be performed at irregular or random intervals so that transit users are unable to predict when compliance determinations are to be performed. In some embodiments, transit vehicle 102 may post rules to transit users that each of portable electronic devices 150 are to remain wirelessly connected to LAN 138 while portable electronic devices 150 are located within range 109. If connectivity between one of portable electronic devices 150 and LAN 138 cannot be established during a compliance determination, then the particular portable electronic device 150 may be found to be non-compliant with the corresponding maximum hardware settings. Alternatively or additionally, transit vehicle 102 may post rules to transit users that all electronic devices within transit vehicle 102 must either be powered off or connected to LAN 138, regardless of whether the electronic device is being used as a ticket or proof of fare. Alternatively or additionally, transit vehicle 102 may act as a faraday cage so that electronic devices within transit vehicle 102 may only obtain external connectivity via LAN 138. Other techniques for ensuring connectivity of portable electronic devices 150 as well as other electronic devices within transit vehicle 102 to LAN 138 may be readily apparent to those skilled in the art.

In some embodiments, an application running on each of portable electronic devices 150 may determine which of zones 182 the device is located in, determine which maximum hardware settings are assigned to the zone the device is located in, and may cause the device to comply with the maximum hardware settings. For example, the application may determine that the device is in a quiet zone and may then cause the device to turn down or off a volume setting of the device. The application may maintain a record of each compliance determination. The record may include the time of the compliance determination and whether the device was compliant with the assigned maximum hardware settings. One or more records of compliance determinations may be sent from each of portable electronic devices 150 to vehicle processor 104 via LAN 146 or to transit server via one or more of LAN 146, WAN 140, and/or cellular network 148.

Figure 8:
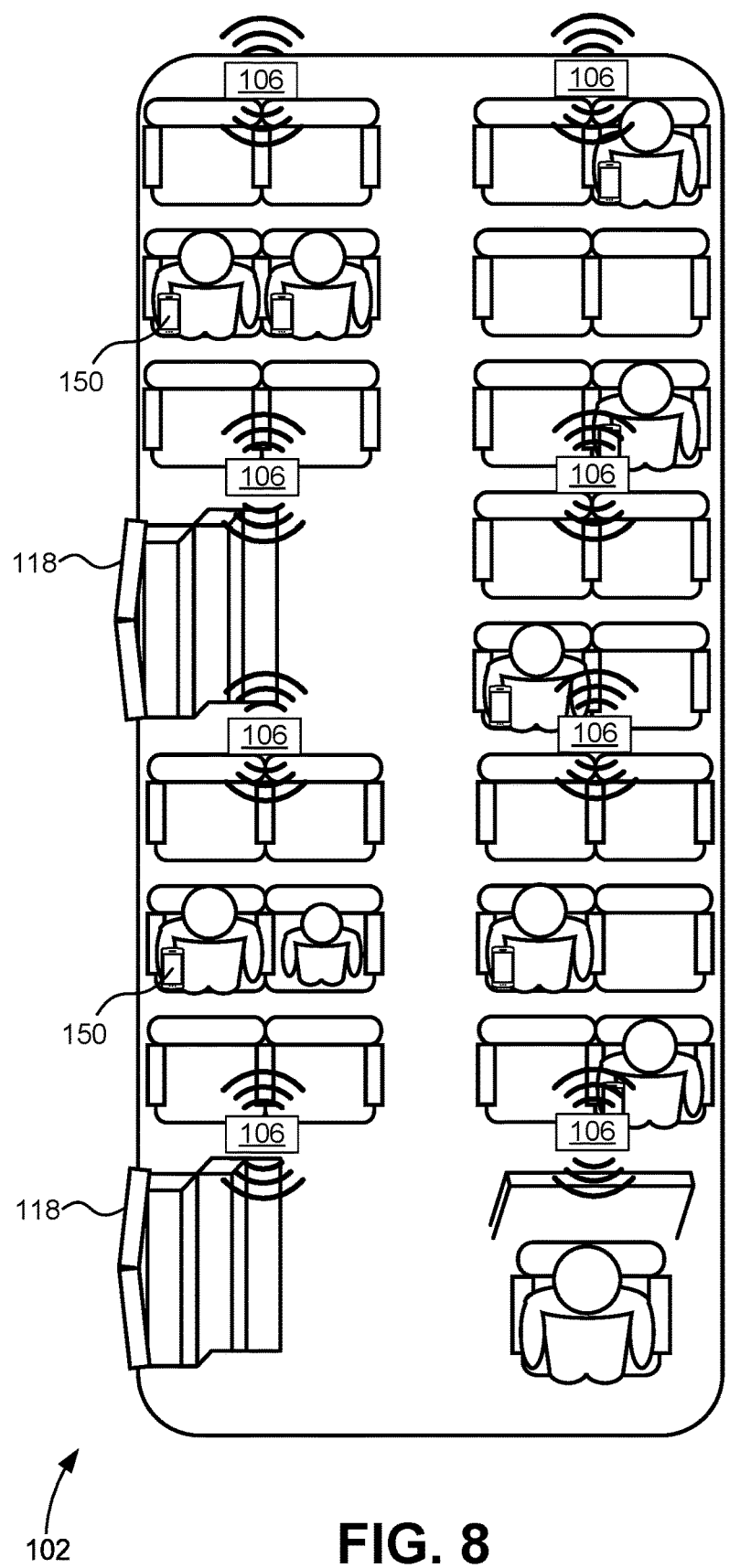
FIG. 8 illustrates a transit vehicle, according to some embodiments of the present invention.

FIG. 8 illustrates transit vehicle 102, according to some embodiments of the present invention. As illustrated, transit vehicle 102 may include a plurality of position sensors 106 configured to transmit wireless beacon signals within transit vehicle 102. Position sensors 106 may be fixed to the ceiling, the floor, and/or the seats of transit vehicle 102, among other possibilities. In some embodiments, position sensors 106 may be attached between and below each pair of seats so that a high signal-to-noise (SNR) may be obtained when portable electronic devices 150 are located near the seats.

Figure 9:
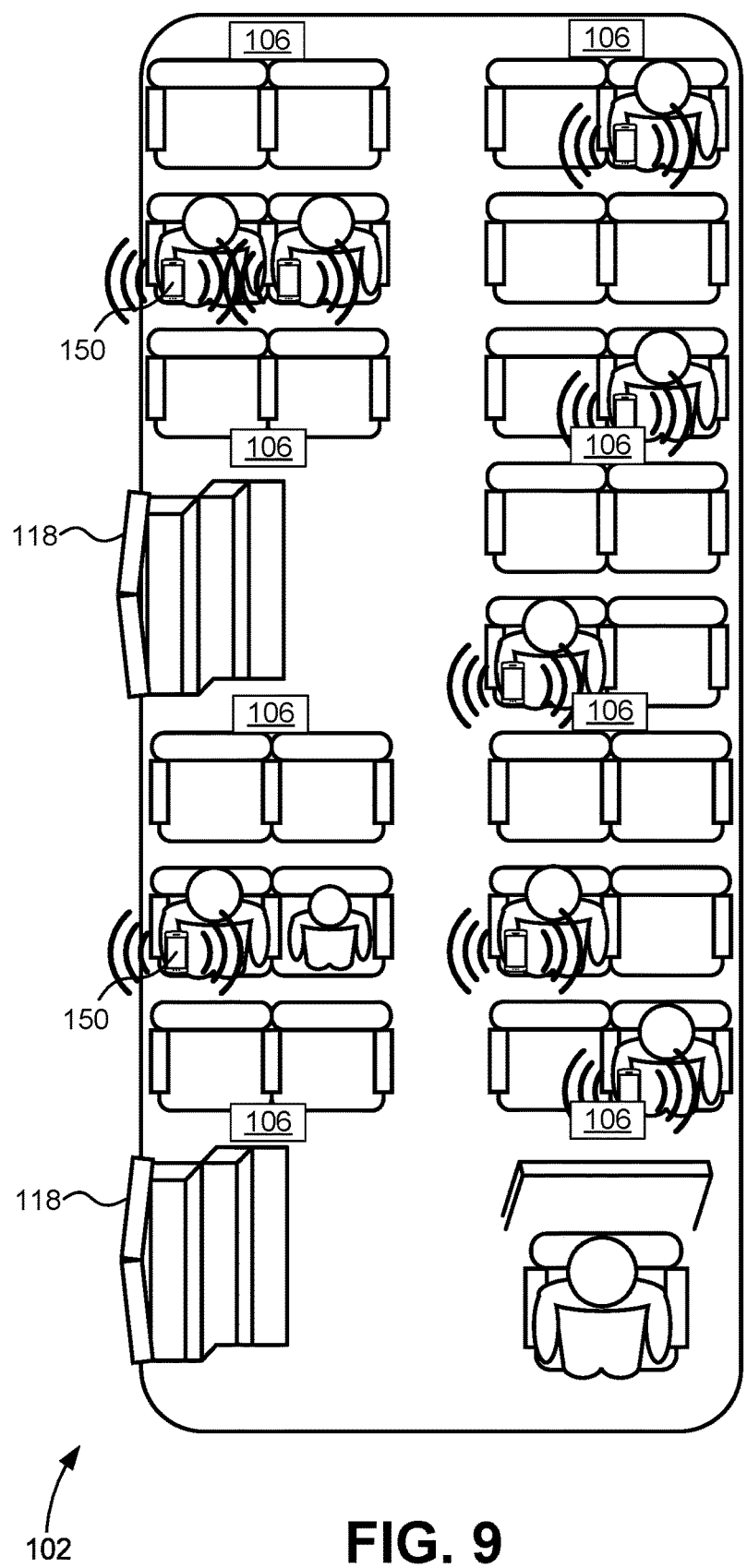
FIG. 9 illustrates a transit vehicle, according to some embodiments of the present invention.

FIG. 9 illustrates transit vehicle 102, according to some embodiments of the present invention. As illustrated, transit vehicle 102 may include a plurality of position sensors 106 configured to receive wireless beacon signals transmitted by a plurality of portable electronic devices 150.

Figure 10:
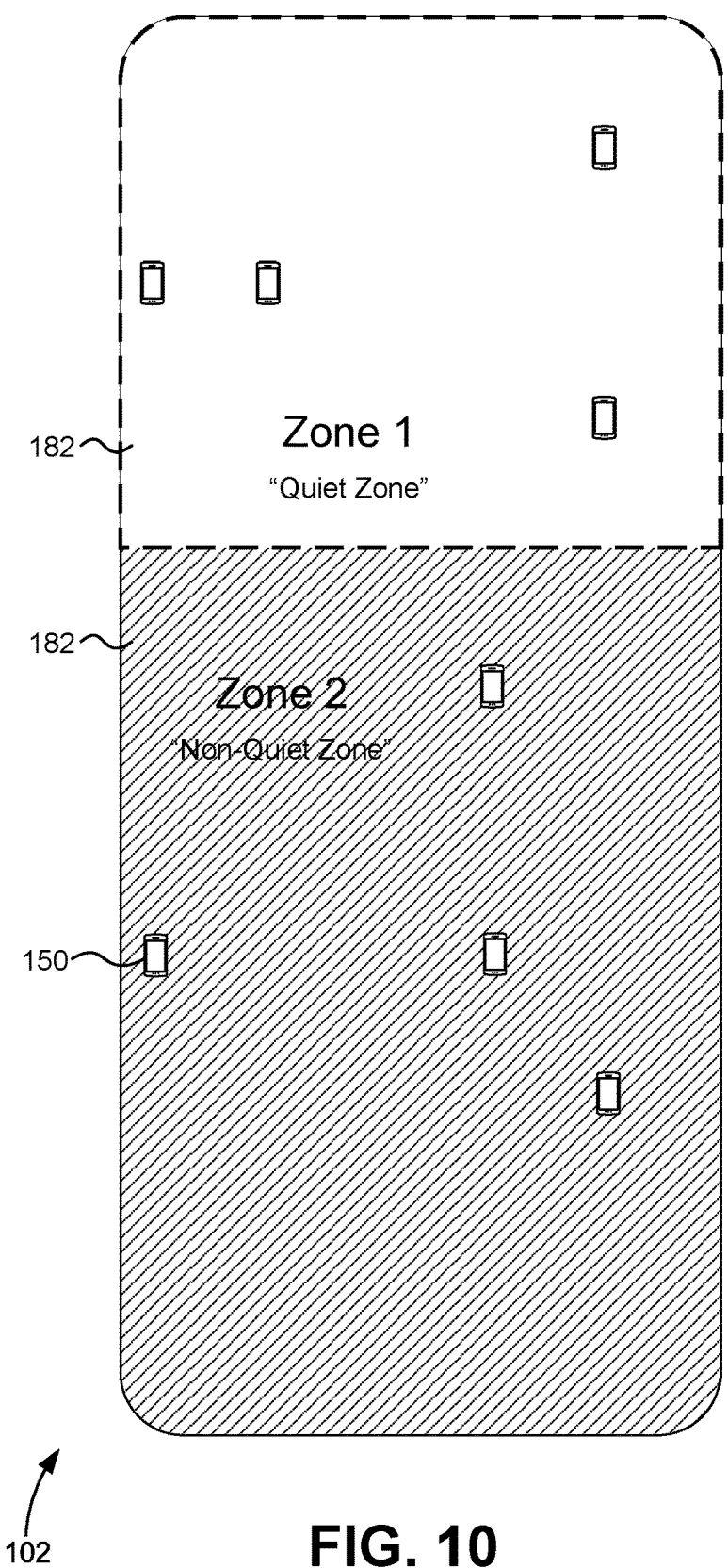
FIG. 10 illustrates zones established within a transit vehicle, according to some embodiments of the present invention.

FIG. 10 illustrates two zones 182 established within transit vehicle 102, according to some embodiments of the present invention. As illustrated, zone 1 is designated as a quiet zone and zone 2 is designated as a non-quiet zone. Accordingly, maximum hardware settings consistent with a quiet zone may be assigned to zone 1 and maximum hardware settings consistent with a non-quiet zone may be assigned to zone 2. Zones 1 and 2 may be predetermined and may be communicated to portable electronic devices 150.

Figure 11:
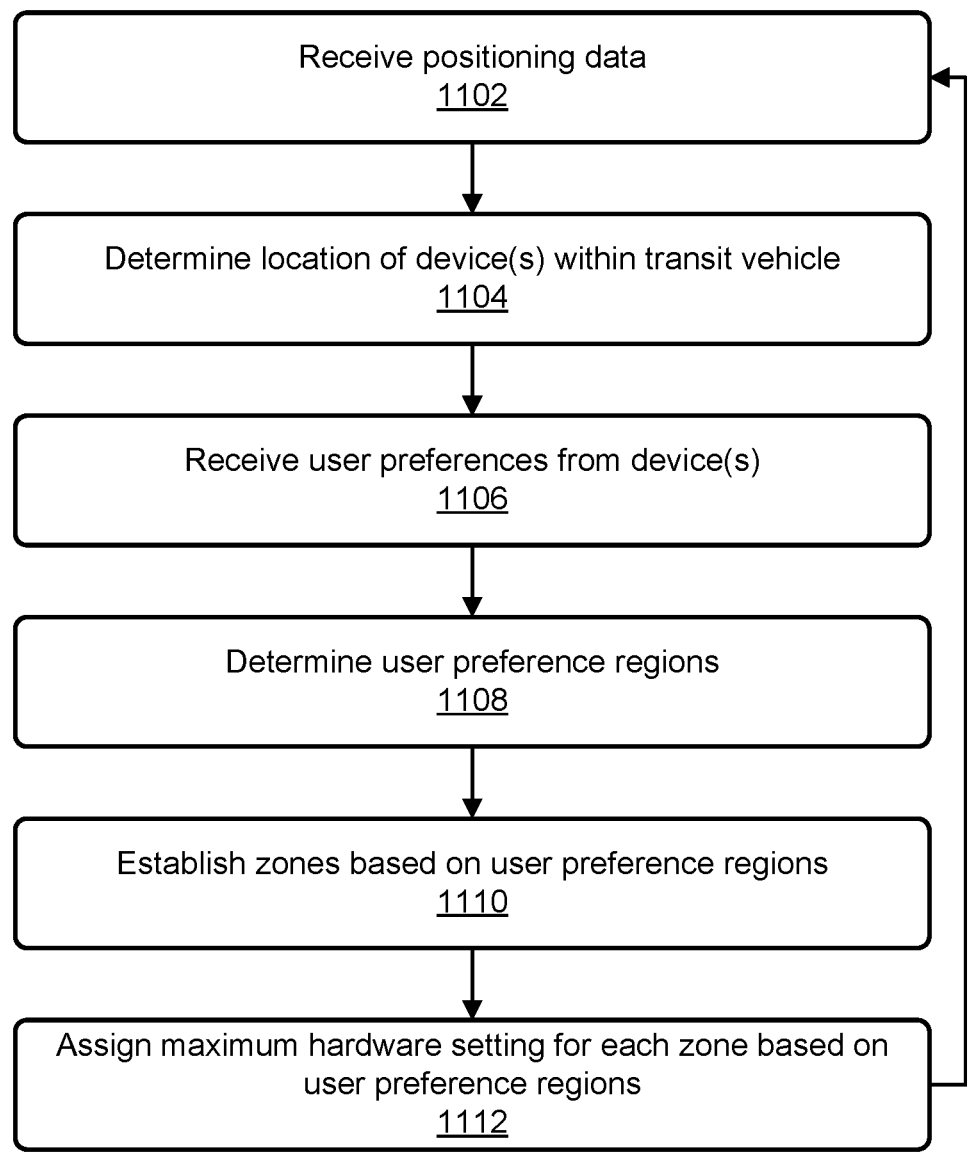
FIG. 11 illustrates a method of establishing and assigning maximum hardware settings to zones, according to some embodiments of the present invention.

FIG. 11 illustrates a method 1100 of establishing and assigning maximum hardware settings to zones 182, according to some embodiments of the present invention. Steps of method 1100 need not be performed in the order shown, and not all steps of method 1100 need be performed during performance of method 1100. One of more steps of method 1100 may be performed by or facilitated by one or more processors of transit server 142, vehicle processor 104, position sensors 106, and/or portable electronic devices 150. One or more steps of method 1100 are further illustrated in reference to FIGS. 12A-13C.

At step 1102, positioning data for each of portable electronic devices 150 is received. In some embodiments, the positioning data is transmitted by portable electronic devices 150 and received by vehicle processor 104, as described in reference to FIG. 4. In some embodiments, the positioning data is transmitted by position sensors 106 and received by vehicle processor 104, as described in reference to FIG. 5. In some embodiments, the positioning data refers to the data contained in the wireless beacon signals that is received by portable electronic devices 150.

At step 1104, a location of each of portable electronic devices 150 within transit vehicle 102 is determined based on the positioning data. In some embodiments, the positioning data directly includes the location of each of portable electronic devices 150. In some embodiments, the positioning data is processed using, for example, a trilateration algorithm to determine the location of each of portable electronic devices 150.

At step 1106, user preferences are received by vehicle processor 104 from portable electronic devices 150. In some embodiments, user preferences are inputted by transit users into portable electronic devices 150 and are sent by portable electronic devices 150 to vehicle processor 104 via LAN 138.

At step 1108, user preference regions 184 are determined based on the user preferences and the locations of portable electronic devices 150. User preference regions 184 may cover physical areas or volumes within transit vehicle 102 and may encompass portable electronic devices 150. In some embodiments, a particular user preference region may be defined as the area or volume surrounding a particular portable electronic device 150 and may, in some embodiments, have a boundary at a fixed distance from the location of the corresponding portable electronic device 150.

At step 1110, at least one zone 182 is established within transit vehicle 102 based on user preference regions 184. In some embodiments, a set of rules may determine which of two or more overlapping user preference regions 184 have priority. For example, in one particular embodiment a user preference region corresponding to a non-quiet zone may have priority over a user preference region corresponding to a quiet zone, two or more user preference regions corresponding to a quiet zone may have priority over a single user preference region corresponding to a non-quiet zone, and two or more user preference regions corresponding to a non-quiet zone may have priority over a single user preference region corresponding to a quiet zone. In some embodiments, the set of rules may determine what happens to areas or volumes within transit vehicle 102 that are not occupied by any of user preference regions 184. For example, in one embodiment areas or volumes that are not occupied by any of user preference regions 184 become a non-quiet zone. Alternatively or additionally, areas or volumes that are not occupied by any of user preference regions 184 may become a quiet zone if it is solely surrounded by quiet zones and a non-quiet zone if it is solely surrounded by non-quiet zones.

At step 1112, one or more maximum hardware settings are assigned to each of zones 182. The maximum hardware settings may include a maximum volume setting, a maximum vibration setting, a maximum brightness setting, a microphone setting, and the like. In many embodiments, step 1112 is performed concurrently with step 1110 and is based on which of user preference regions 184 have priority at a particular location within transit vehicle 102.

Figure 12A:
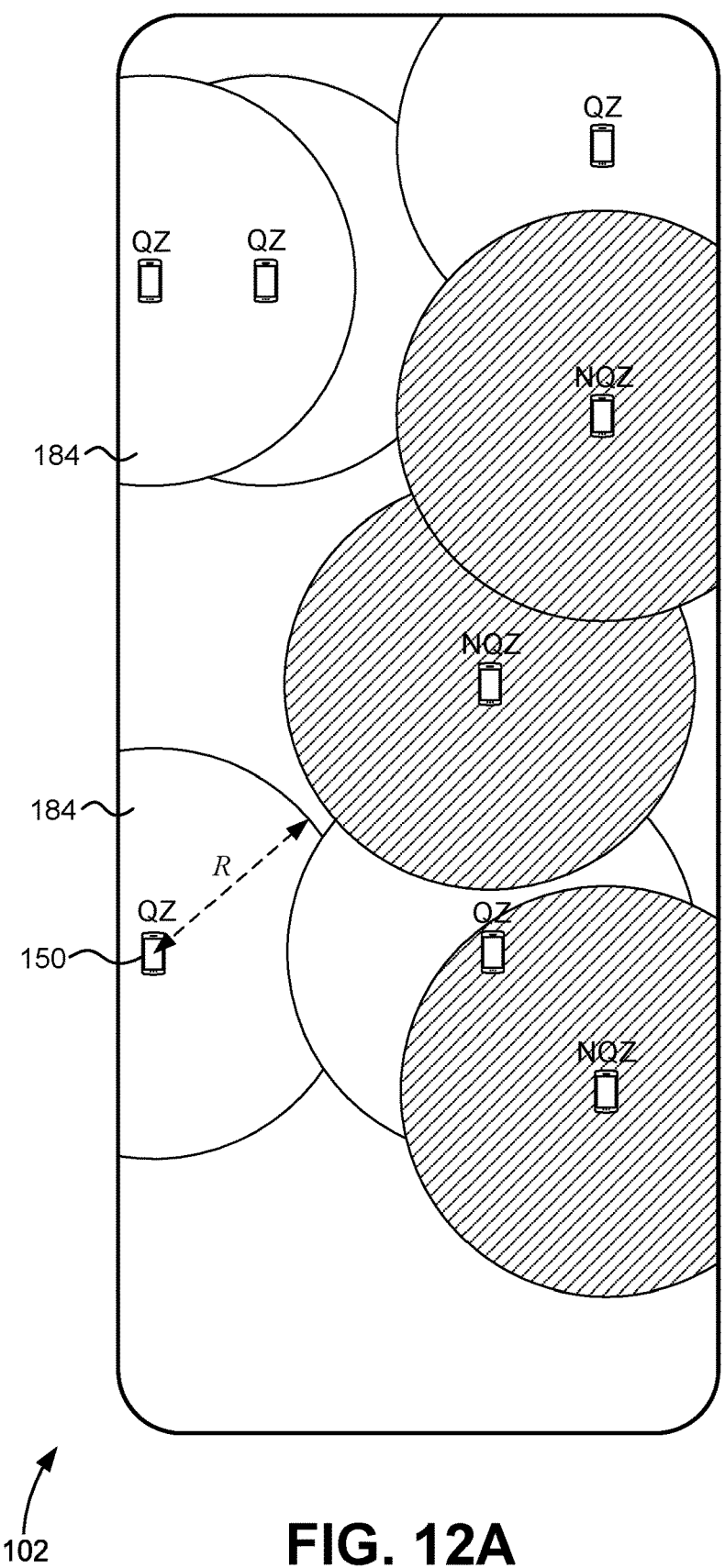
FIGS. 12A-12C illustrate a transit vehicle, according to some embodiments of the present invention.

FIG. 12A illustrates transit vehicle 102 and performance of step 1108 in which user preference regions 184 are determined based on the user preferences ("QZ" for "quiet zone" or "NQZ" for "non-quiet zone") and the locations of portable electronic devices 150. As illustrated, user preference regions 184 are initially determined to be circles surrounding portable electronic devices 150, each of user preference regions 184 corresponding to a quiet zone or a non-quiet zone. Each of user preference regions 184 may have a radius R that is predetermined and may be based on user comfort levels and/or an ambient noise level of transit vehicle 102. For example, radius R may be smaller in transit vehicles 102 with higher ambient noise levels (such as a city bus) where disturbances caused by electronic devices may have less of an effect on what passengers perceive around them. In contrast, radius R may be larger in transit vehicles 102 with lower ambient noise levels (such as trains) where disturbances caused by electronic devices are more noticeable over larger distances.

Figure 12B:
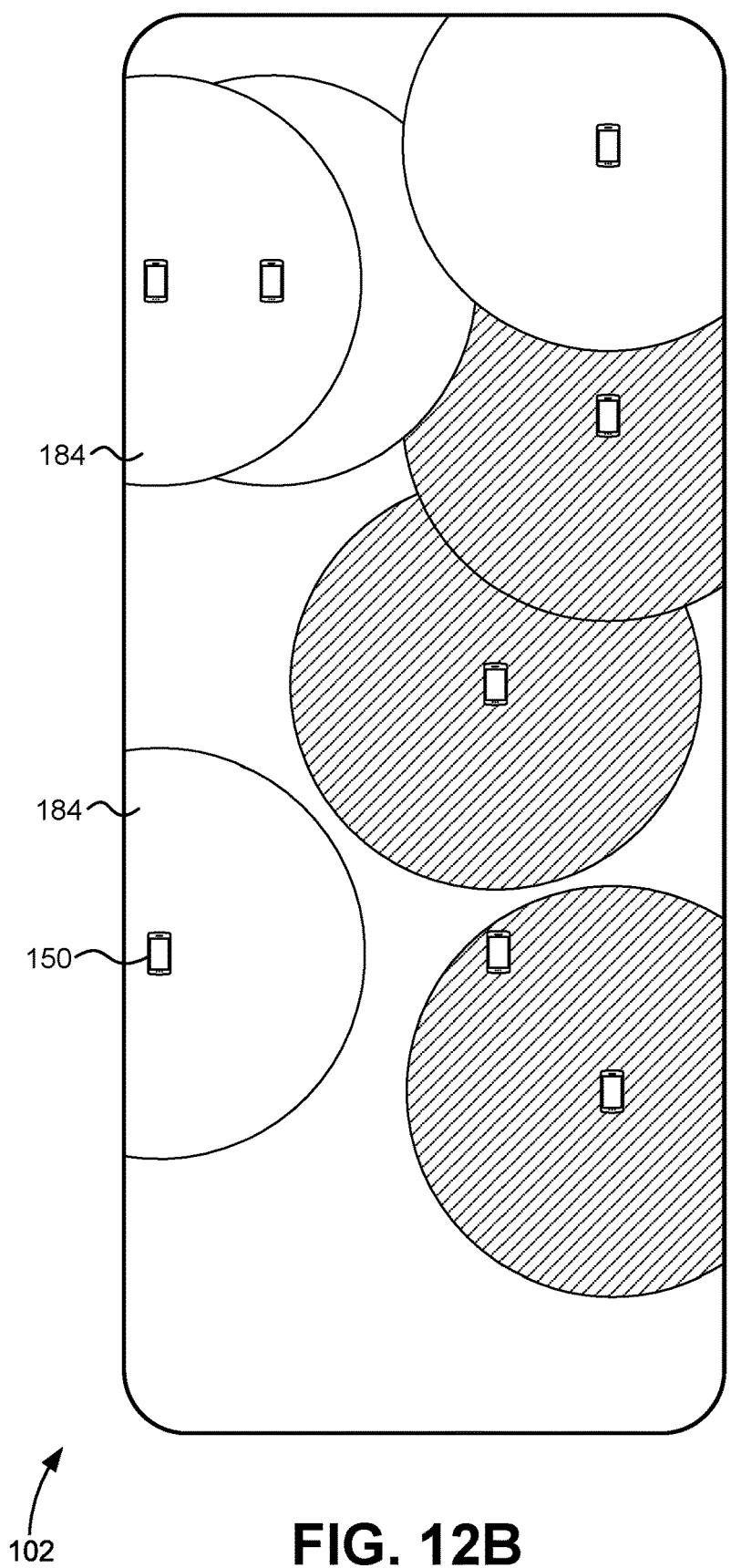

FIG. 12B illustrates transit vehicle 102 and further performance of step 1108 in which a set of rules regarding overlapping user preference regions 184 are implemented. In the specific embodiment shown, the set of rules provide that user preference regions 184 corresponding to quiet zones take priority over user preference regions 184 corresponding to non-quiet zones. The set of rules also provide that user preference regions 184 corresponding to quiet zones having a center within any of user preference regions 184 corresponding to non-quiet zones are removed.

Figure 12C:
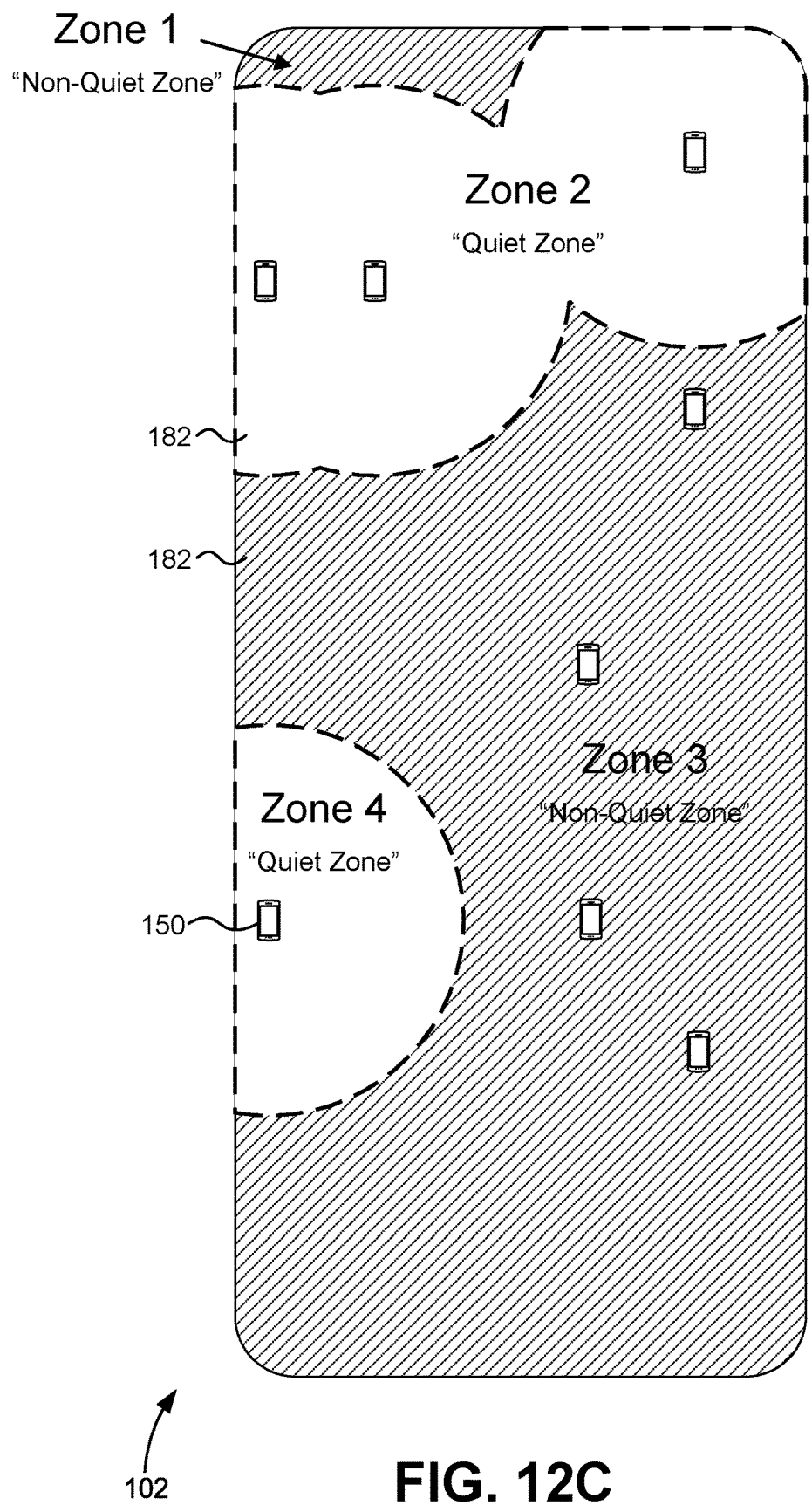

FIG. 12C illustrates transit vehicle 102 and performance of steps 1108 and 1110 in which zones 182 are established and maximum hardware settings are assigned to each of zones 182. In the specific embodiment shown, the set of rules may provide that areas that are not occupied by any of user preference regions 184 become non-quiet zones. Accordingly, all user preference regions 184 corresponding to quiet zones in FIG. 12B become quiet zones in FIG. 12C, and all remaining areas become non-quiet zones, resulting in two quiet zones (zones 2 and 4) and two non-quiet zones (zones 1 and 3).

Figure 13A:
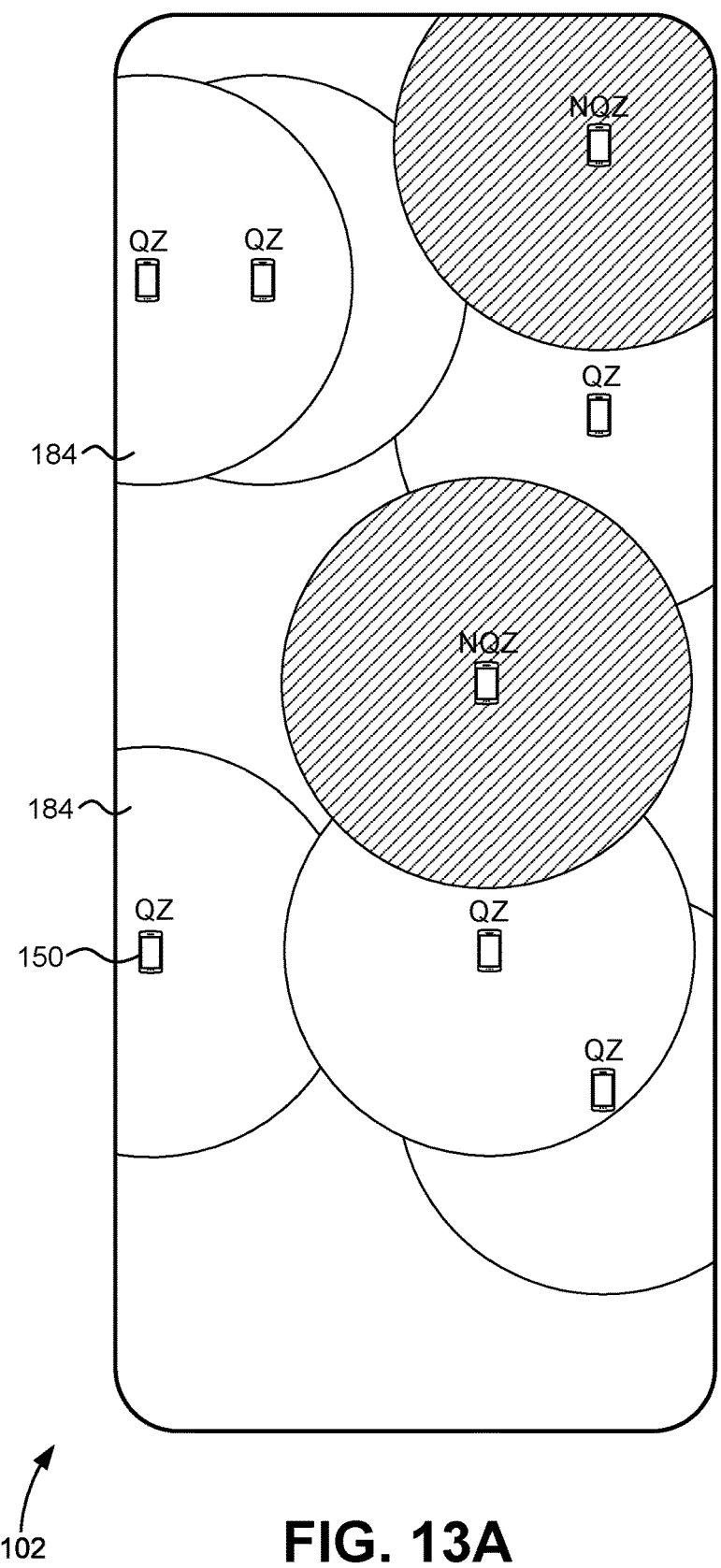
FIG. 13A-13C illustrate a transit vehicle, according to some embodiments of the present invention.

FIG. 13A illustrates transit vehicle 102 and performance of step 1108 in which user preference regions 184 are determined based on the user preferences and the locations of portable electronic devices 150. The embodiment shown in FIGS. 13A-13C may occur subsequent to the embodiment shown in FIGS. 12A-12C and may correspond to the situation in which three transit users change their user preferences while transit vehicle 102 is operating. As illustrated, user preference regions 184 are determined to be circles surrounding portable electronic devices 150, each of user preference regions 184 corresponding to a quiet zone or a non-quiet zone.

Figure 13B:
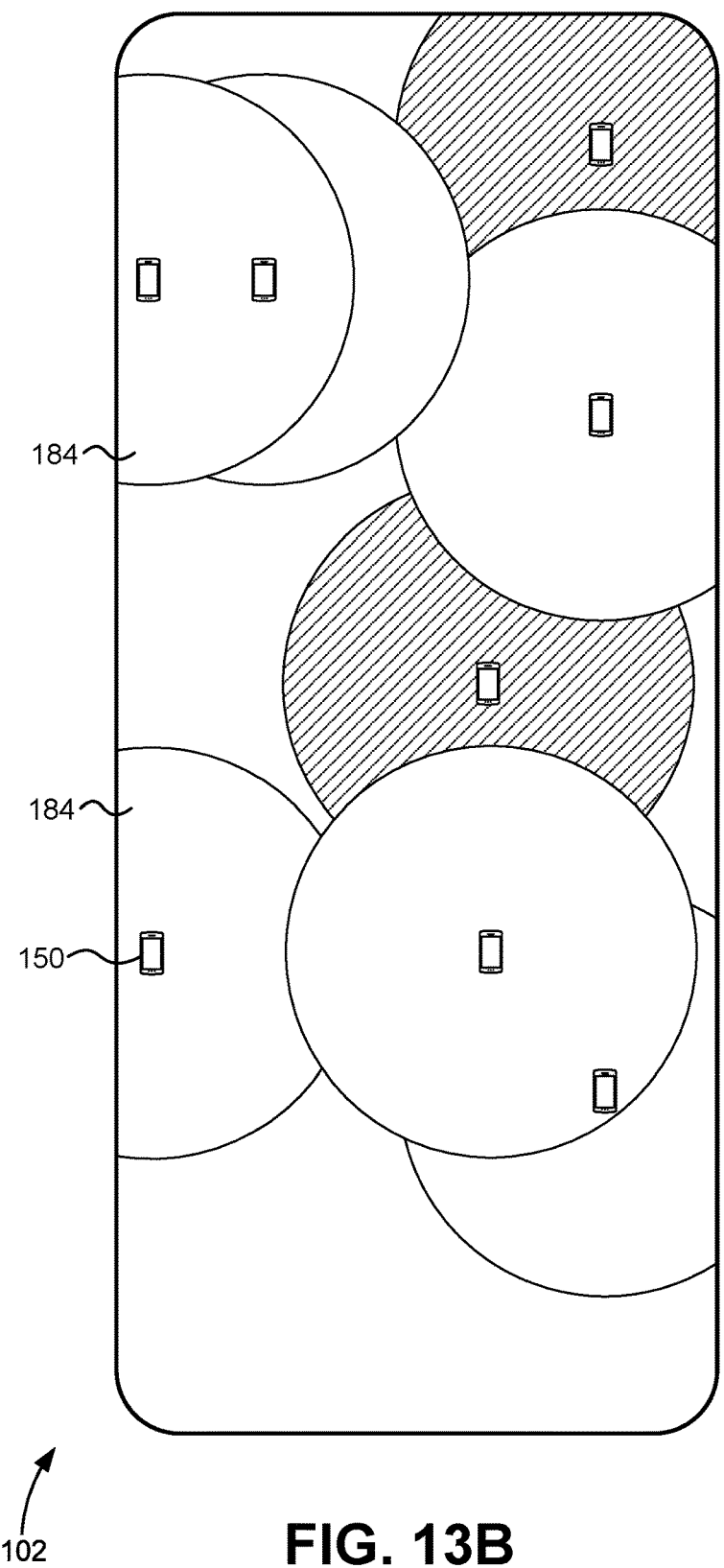

FIG. 13B illustrates transit vehicle 102 and further performance of step 1108 in which a set of rules regarding overlapping user preference regions 184 are implemented. In the specific embodiment shown, the set of rules provide that user preference regions 184 corresponding to quiet zones take priority over user preference regions 184 corresponding to non-quiet zones.

Figure 13C:
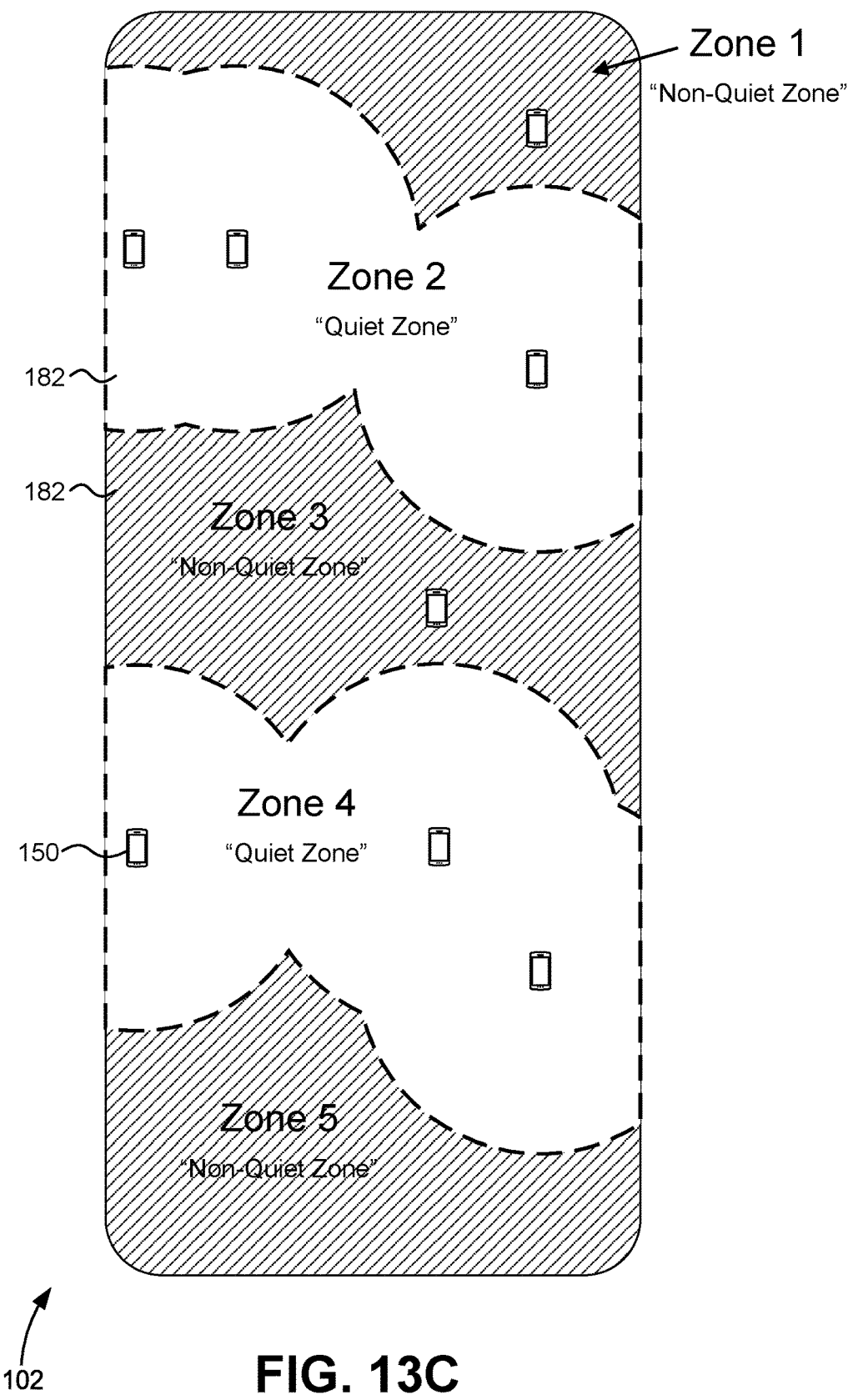

FIG. 13C illustrates transit vehicle 102 and performance of steps 1108 and 1110 in which zones 182 are established and maximum hardware settings are assigned to each of zones 182. In the specific embodiment shown, the set of rules may provide that areas that are not occupied by any of user preference regions 184 become non-quiet zones. Accordingly, all user preference regions 184 corresponding to quiet zones in FIG. 13B become quiet zones in FIG. 13C, and all remaining areas become non-quiet zones, resulting in two quiet zones (zones 2 and 4) and three non-quiet zones (zones 1, 3, and 5).

Figure 14:
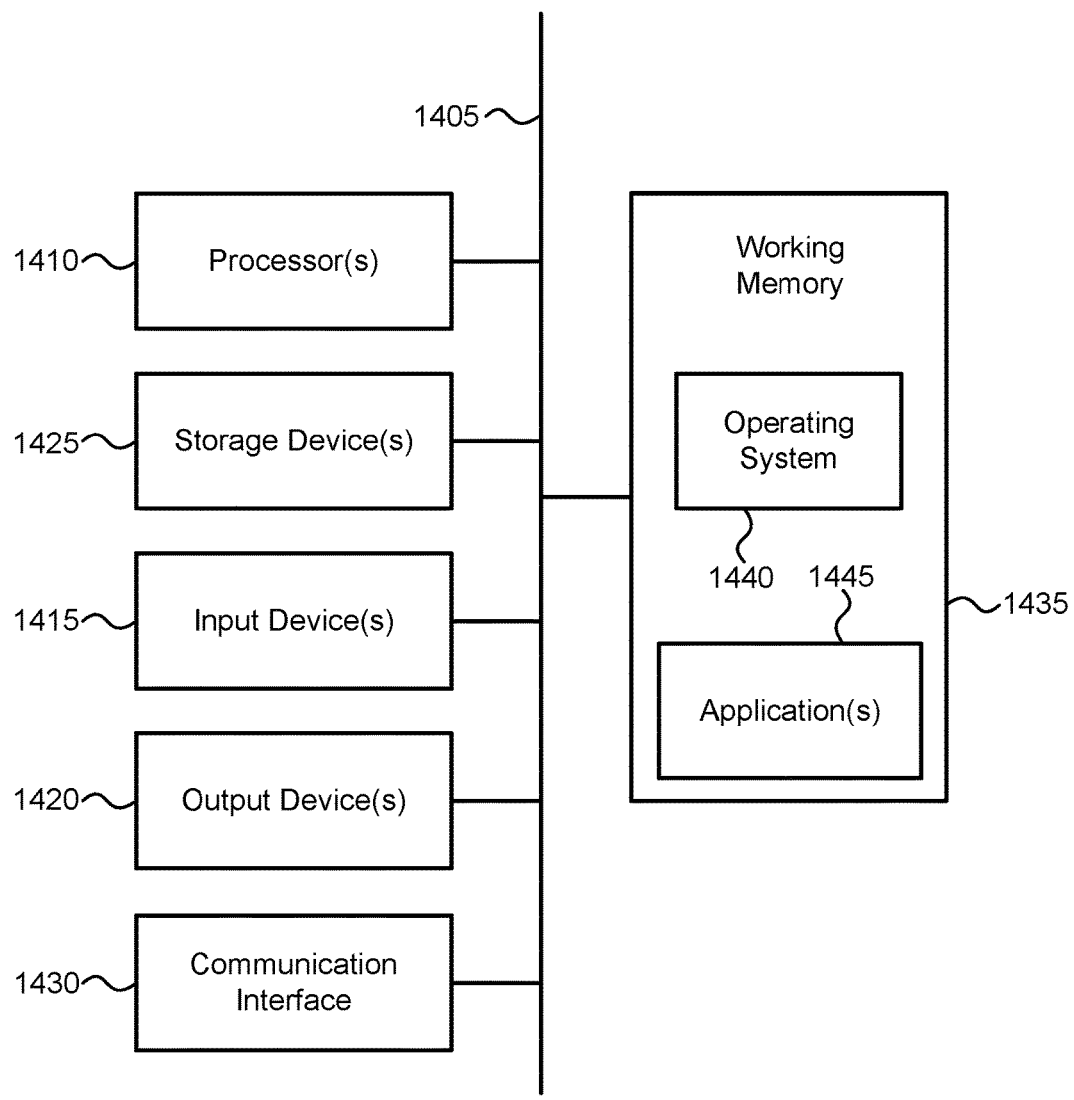
FIG. 14 illustrates a simplified computer system, according to some embodiments of the present invention.

FIG. 14 illustrates a simplified computer system 1400, according to some embodiments of the present invention. Computer system 1400 may be incorporated as part of the previously described computerized devices. For example, computer system 1400 can represent some of the components of transit server 142, ticket vending machine 116, access control point 118, portable electronic device 150, vehicle processor 104, and the like. FIG. 14 provides a schematic illustration of one embodiment of a computer system 1400 that can perform the methods provided by various other embodiments, as described herein. FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements may include a processing unit 1410, including without limitation one or more general-purpose processors and/or one or more special-purpose processors (such as digital signal processing chips, graphics acceleration processors, and/or the like); one or more input devices 1415, which can include without limitation a keyboard, a touchscreen, receiver, a motion sensor, a camera, a smartcard reader, a contactless media reader, and/or the like; and one or more output devices 1420, which can include without limitation a display device, a speaker, a printer, a writing module, and/or the like.

The computer system 1400 may further include (and/or be in communication with) one or more non-transitory storage devices 1425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communication interface 1430, which can include without limitation a modem, a network card (wireless or wired), an infrared communication device, a wireless communication device and/or chipset (such as a Bluetooth™ device, an 802.11 device, a Wi-Fi device, a WiMax device, an NFC device, cellular communication facilities, etc.), and/or similar communication interfaces. The communication interface 1430 may permit data to be exchanged with a network (such as the network described below, to name one example), other computer systems, and/or any other devices described herein. In many embodiments, the computer system 1400 will further comprise a non-transitory working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1410, applications 1445, etc.) Further, connection to other computing devices such as network input/output devices may be employed.

Some embodiments may employ a computer system (such as the computer system 1400) to perform methods in accordance with the disclosure. For example, some or all of the procedures of the described methods may be performed by the computer system 1400 in response to processing unit 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processing unit 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processing unit 1410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire and fiber optics, including the wires that comprise the bus 1405, as well as the various components of the communication interface 1430 (and/or the media by which the communication interface 1430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1430 (and/or components thereof) generally will receive the signals, and the bus 1405 then might carry the signals (and/or the data, instructions, etc. carried by the signals) to the working memory 1435, from which the processor(s) 1405 retrieves and executes the instructions. The instructions received by the working memory 1435 may optionally be stored on a non-transitory storage device 1425 either before or after execution by the processing unit 1410.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method of restricting electronic devices to maximum hardware settings within a transit vehicle, the method comprising:
   receiving positioning data for each of a plurality of portable electronic devices;
   determining a location of each of the plurality of portable electronic devices within the transit vehicle based on the positioning data;
   receiving, from each of the plurality of portable electronic devices, a user preference indicating a desired maximum hardware setting;
   establishing a plurality of zones within the transit vehicle;
   assigning one or more maximum hardware settings to each of the plurality of zones based on the location of each of the plurality of portable electronic devices and the desired maximum hardware setting indicated by the user preference received from each of the plurality of portable electronic devices; and
   ensuring compliance of each of the plurality of portable electronic devices with the one or more maximum hardware settings based on the location of each of the plurality of portable electronic devices.

2. The method of claim 1, further comprising:
   transmitting, by a plurality of position sensors located throughout the transit vehicle, wireless beacon signals each indicating a transmitting position sensor of the plurality of position sensors, wherein the wireless beacon signals are received by the plurality of portable electronic devices, and wherein the positioning data is generated and transmitted by the plurality of portable electronic devices based on the received wireless beacon signals.

3. The method of claim 1, further comprising:
   receiving, by a plurality of position sensors located throughout the transit vehicle, wireless beacon signals transmitted by the plurality of portable electronic devices, and wherein the positioning data is generated based on the received wireless beacon signals.

4. The method of claim 1, wherein establishing the plurality of zones within the transit vehicle includes using a predetermined set of zones.

5. The method of claim 1, wherein the one or more maximum hardware settings includes one or more of:
   a maximum volume setting;
   a maximum vibration setting;
   a maximum brightness setting; and
   a microphone setting.

6. The method of claim 1, wherein ensuring compliance of each of the plurality of portable electronic devices with the one or more maximum hardware settings based on the location of each of the plurality of portable electronic devices includes:
   for each device of the plurality of portable electronic devices that is not in compliance with the one or more maximum hardware settings, sending an instruction to the device to cause the device to comply with the one or more maximum hardware settings.

7. A non-transitory computer-readable medium for restricting electronic devices to maximum hardware settings within a transit vehicle, wherein the non-transitory computer-readable medium comprises instructions that, when executed by a processor, cause the processor to perform operations comprising:
   receiving positioning data for each of a plurality of portable electronic devices;
   determining a location of each of the plurality of portable electronic devices within the transit vehicle based on the positioning data;
   receiving, from each of the plurality of portable electronic devices, a user preference indicating a desired maximum hardware setting;
   establishing a plurality of zones within the transit vehicle;
   assigning one or more maximum hardware settings to each of the plurality of zones based on the location of each of the plurality of portable electronic devices and the desired maximum hardware setting indicated by the user preference received from each of the plurality of portable electronic devices; and
   ensuring compliance of each of the plurality of portable electronic devices with the one or more maximum hardware settings based on the location of each of the plurality of portable electronic devices.

8. The non-transitory computer-readable medium of claim 7, wherein the operations further comprise:
   transmitting, by a plurality of position sensors located throughout the transit vehicle, wireless beacon signals each indicating a transmitting position sensor of the plurality of position sensors, wherein the wireless beacon signals are received by the plurality of portable electronic devices, and wherein the positioning data is generated and transmitted by the plurality of portable electronic devices based on the received wireless beacon signals.

9. The non-transitory computer-readable medium of claim 7, wherein the operations further comprise:
   receiving, by a plurality of position sensors located throughout the transit vehicle, wireless beacon signals transmitted by the plurality of portable electronic devices, and wherein the positioning data is generated based on the received wireless beacon signals.

10. The non-transitory computer-readable medium of claim 7, wherein establishing the plurality of zones within the transit vehicle includes using a predetermined set of zones.

11. The non-transitory computer-readable medium of claim 7, wherein the one or more maximum hardware settings includes one or more of:
- a maximum volume setting;
- a maximum vibration setting;
- a maximum brightness setting; and
- a microphone setting.

12. The non-transitory computer-readable medium of claim 7, wherein ensuring compliance of each of the plurality of portable electronic devices with the one or more maximum hardware settings based on the location of each of the plurality of portable electronic devices includes:
- for each device of the plurality of portable electronic devices that is not in compliance with the one or more maximum hardware settings, sending an instruction to the device to cause the device to comply with the one or more maximum hardware settings.

13. A system for restricting electronic devices to maximum hardware settings within a transit vehicle, the system comprising:
- one or more processors;
- a non-transitory computer-readable medium comprising instructions that, when executed by the one or more processors, cause the one or more processors to perform operations comprising:
  - receiving positioning data for each of a plurality of portable electronic devices;
  - determining a location of each of the plurality of portable electronic devices within the transit vehicle based on the positioning data;
  - receiving, from each of the plurality of portable electronic devices, a user preference indicating a desired maximum hardware setting;
  - establishing a plurality of zones within the transit vehicle;
  - assigning one or more maximum hardware settings to each of the plurality of zones based on the location of each of the plurality of portable electronic devices and the desired maximum hardware setting indicated by the user preference received from each of the plurality of portable electronic devices; and
  - ensuring compliance of each of the plurality of portable electronic devices with the one or more maximum hardware settings based on the location of each of the plurality of portable electronic devices.

14. The system of claim 13, wherein the operations further comprise:
- transmitting, by a plurality of position sensors located throughout the transit vehicle, wireless beacon signals each indicating a transmitting position sensor of the plurality of position sensors, wherein the wireless beacon signals are received by the plurality of portable electronic devices, and wherein the positioning data is generated and transmitted by the plurality of portable electronic devices based on the received wireless beacon signals.

15. The system of claim 13, wherein the operations further comprise:
- receiving, by a plurality of position sensors located throughout the transit vehicle, wireless beacon signals transmitted by the plurality of portable electronic devices, and wherein the positioning data is generated based on the received wireless beacon signals.

16. The system of claim 13, wherein ensuring compliance of each of the plurality of portable electronic devices with the one or more maximum hardware settings based on the location of each of the plurality of portable electronic devices includes:
- for each device of the plurality of portable electronic devices that is not in compliance with the one or more maximum hardware settings, sending an instruction to the device to cause the device to comply with the one or more maximum hardware settings.

* * * * *